(12) United States Patent
Krasnoff et al.

(10) Patent No.: US 9,567,750 B2
(45) Date of Patent: *Feb. 14, 2017

(54) NONWOVEN CEMENTITIOUS COMPOSITE FOR IN-SITU HYDRATION

(71) Applicant: Cortex Composites, Inc., Pacific Palisades, CA (US)

(72) Inventors: Curren E. Krasnoff, Pacific Palisades, CA (US); Neal S. Berke, Portage, MI (US)

(73) Assignee: Cortex Composites, Inc., Pacific Palisades, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/933,898

(22) Filed: Nov. 5, 2015

(65) Prior Publication Data
US 2016/0052236 A1     Feb. 25, 2016

Related U.S. Application Data

(63) Continuation of application No. 14/185,610, filed on Feb. 20, 2014, now Pat. No. 9,187,902, which is a (Continued)

(51) Int. Cl.
*E04C 5/00*     (2006.01)
*B32B 5/02*     (2006.01)
(Continued)

(52) U.S. Cl.
CPC . *E04C 5/00* (2013.01); *B32B 3/28* (2013.01); *B32B 3/30* (2013.01); *B32B 5/022* (2013.01); (Continued)

(58) Field of Classification Search
CPC .............. Y10T 428/24702; Y10T 428/249932; Y10T 442/184; Y10T 442/198; Y10T 442/171;Y10T 442/361; Y10T 442/3797; Y10T 442/665; Y10T 442/653; Y10T 442/699; B32B 3/30; B32B 5/26; B32B 27/12; B32B 2315/06; B32B 13/01; B32B 13/14; B32B 13/02; B32B 13/12; B32B 2250/02; B32B 2255/02; B32B 2255/10; B32B 2260/021; B32B 2260/044; B32B 2262/02; B32B 2262/0223; B32B 2264/10; B32B 2307/31; B32B 2307/54; B32B 2307/7166; B32B 2307/72; B32B 2307/726; B32B 2307/7265; B32B 2419/00; B32B 2471/00; B32B 27/14; B32B 27/32; B32B 3/266; B32B 3/28; B32B 5/022; B32B 5/024; B32B 5/06; B32B 5/16; B32B 5/22; B32B 7/045; B32B 7/10; B32B 7/12; E01C 11/18; E01C 9/001; E04C 5/00; E04C 5/07; E04C 5/073

See application file for complete search history.

(56) References Cited

U.S. PATENT DOCUMENTS

| | | |
|---|---|---|
| 984,121 A | 2/1911 | Condie |
| 2,958,593 A | 11/1960 | Hoover et al. |
| (Continued) | | |

FOREIGN PATENT DOCUMENTS

| | | |
|---|---|---|
| CN | 101500790 | 8/2009 |
| DE | 90 16 062 U1 | 2/1991 |
| (Continued) | | |

OTHER PUBLICATIONS

U.S. Appl. No. 13/471,849, filed May 15, 2012, Ferraiolo. F.
(Continued)

*Primary Examiner* — Jennifer A Steele
(74) *Attorney, Agent, or Firm* — Foley & Lardner LLP

(57) ABSTRACT

A cementitious composite material for in-situ hydration includes a first layer having a nonwoven configuration and
(Continued)

a cementitious material disposed within the first layer. The first layer has a first side and an opposing second side, and the first layer includes a plurality of discrete nodes spaced relative to one another along a first direction and a second direction. The cementitious composite material further includes a second layer disposed along the first side of the first layer and a third layer disposed along the opposing second side of the first layer and configured to prevent at least a portion of the plurality of cementitious particles from migrating out of the first layer. The cementitious material includes a plurality of cementitious particles, the first layer and the second layer include flexible materials, and the second layer is coupled to the first layer at the plurality of discrete nodes.

16 Claims, 16 Drawing Sheets

Related U.S. Application Data continuation-in-part of application No. PCT/US2012/062831, filed on Oct. 31, 2012.

(60) Provisional application No. 61/877,857, filed on Sep. 13, 2013, provisional application No. 61/554,377, filed on Nov. 1, 2011, provisional application No. 61/703,618, filed on Sep. 20, 2012.

(51) Int. Cl.

| | |
|---|---|
| B32B 7/12 | (2006.01) |
| B32B 27/32 | (2006.01) |
| B32B 13/12 | (2006.01) |
| B32B 5/22 | (2006.01) |
| B32B 5/16 | (2006.01) |
| B32B 7/10 | (2006.01) |
| B32B 27/14 | (2006.01) |
| E01C 11/18 | (2006.01) |
| E01C 9/00 | (2006.01) |
| B32B 3/30 | (2006.01) |
| B32B 3/28 | (2006.01) |
| E04C 5/07 | (2006.01) |
| B32B 13/14 | (2006.01) |
| B32B 5/26 | (2006.01) |
| B32B 27/12 | (2006.01) |
| B32B 13/02 | (2006.01) |
| B32B 5/06 | (2006.01) |
| B32B 3/26 | (2006.01) |
| B32B 7/04 | (2006.01) |

(52) U.S. Cl.
CPC ............... *B32B 5/024* (2013.01); *B32B 5/16* (2013.01); *B32B 5/22* (2013.01); *B32B 5/26* (2013.01); *B32B 7/10* (2013.01); *B32B 7/12* (2013.01); *B32B 13/02* (2013.01); *B32B 13/12* (2013.01); *B32B 13/14* (2013.01); *B32B 27/12* (2013.01); *B32B 27/14* (2013.01); *B32B 27/32* (2013.01); *E01C 9/001* (2013.01); *E01C 11/18* (2013.01); *E04C 5/07* (2013.01); *E04C 5/073* (2013.01); *B32B 3/266* (2013.01); *B32B 5/028* (2013.01); *B32B 5/06* (2013.01); *B32B 7/045* (2013.01); *B32B 2250/02* (2013.01); *B32B 2255/02* (2013.01); *B32B 2255/10* (2013.01); *B32B 2260/021* (2013.01); *B32B 2260/044* (2013.01); *B32B 2262/02* (2013.01); *B32B 2262/0223* (2013.01); *B32B 2264/10* (2013.01); *B32B 2307/31* (2013.01); *B32B 2307/54* (2013.01); *B32B 2307/546* (2013.01); *B32B 2307/7166* (2013.01); *B32B 2307/72* (2013.01); *B32B 2307/726* (2013.01); *B32B 2307/7265* (2013.01); *B32B 2419/00* (2013.01); *B32B 2471/00* (2013.01); *Y10T 428/24702* (2015.01); *Y10T 428/249932* (2015.04); *Y10T 442/198* (2015.04); *Y10T 442/361* (2015.04); *Y10T 442/3797* (2015.04); *Y10T 442/653* (2015.04); *Y10T 442/699* (2015.04)

(56) References Cited

U.S. PATENT DOCUMENTS

| | | | |
|---|---|---|---|
| 3,373,741 | A | 3/1968 | Hill et al. |
| 3,537,121 | A | 11/1970 | McAvoy |
| 3,897,073 | A | 7/1975 | Swanson et al. |
| 3,900,024 | A | 8/1975 | Lauber et al. |
| 3,917,285 | A | 11/1975 | Swanson et al. |
| 4,235,228 | A | 11/1980 | Gaylord et al. |
| 4,437,271 | A | 3/1984 | McAvoy |
| 4,495,235 | A | 1/1985 | Tesch |
| 4,617,219 | A | 10/1986 | Schupack |
| 4,622,260 | A | 11/1986 | Tesch |
| 5,041,330 | A | 8/1991 | Heerten et al. |
| 5,102,726 | A | 4/1992 | Gabbay |
| 5,112,665 | A | 5/1992 | Alexander |
| 5,174,231 | A | 12/1992 | White |
| 5,346,566 | A | 9/1994 | White |
| 5,461,885 | A | 10/1995 | Yokoyama et al. |
| 5,475,904 | A | 12/1995 | Le Roy |
| 5,543,188 | A | 8/1996 | Te'eni |
| 5,589,245 | A | 12/1996 | Roell |
| 6,156,406 | A | 12/2000 | Rock et al. |
| 6,461,317 | B1 | 10/2002 | Grim et al. |
| 6,477,865 | B1 | 11/2002 | Matsumoto |
| 6,586,083 | B1 | 7/2003 | Weiss et al. |
| 6,630,414 | B1 | 10/2003 | Matsumoto |
| 6,723,416 | B1 | 4/2004 | Groitzsch et al. |
| 7,465,283 | B2 | 12/2008 | Grim et al. |
| 7,552,604 | B1 | 6/2009 | Waldrop et al. |
| 7,607,730 | B2 | 10/2009 | Moseneder |
| 7,611,999 | B2 | 11/2009 | McMurray |
| 7,721,749 | B2 | 5/2010 | Brewin et al. |
| 7,762,970 | B2 | 7/2010 | Henderson et al. |
| 7,763,339 | B2 | 7/2010 | Groitzsch et al. |
| 7,849,715 | B2 | 12/2010 | Starbuck et al. |
| 7,913,520 | B1 | 3/2011 | Chen et al. |
| 7,937,973 | B2 | 5/2011 | Sorensen et al. |
| 7,960,603 | B2 | 6/2011 | Evans |
| 8,287,982 | B2 | 10/2012 | Brewin et al. |
| 8,343,609 | B2 | 1/2013 | Crawford et al. |
| 8,703,266 | B2 | 4/2014 | Crawford et al. |
| 9,187,902 | B2 | 11/2015 | Krasnoff et al. |
| 2002/0090871 | A1 | 7/2002 | Ritchie et al. |
| 2003/0077965 | A1 | 4/2003 | Mack et al. |
| 2004/0097151 | A1 | 5/2004 | McMurray |
| 2006/0099415 | A1 | 5/2006 | Morin |
| 2006/0155223 | A1 | 7/2006 | Koch |
| 2007/0238392 | A1 | 10/2007 | Starbuck et al. |
| 2007/0293112 | A1 | 12/2007 | Hanson et al. |
| 2008/0017229 | A1 | 1/2008 | Brewin et al. |
| 2008/0118735 | A1 | 5/2008 | Kanao |
| 2008/0287852 | A1 | 11/2008 | Evans |
| 2010/0233417 | A1 | 9/2010 | Brewin et al. |
| 2011/0086214 | A1 | 4/2011 | Rockwell |
| 2012/0223004 | A1 | 9/2012 | Ferraiolo |
| 2013/0129946 | A1 | 5/2013 | Crawford et al. |
| 2014/0205776 | A1 | 7/2014 | Crawford et al. |

FOREIGN PATENT DOCUMENTS

| | | |
|---|---|---|
| DE | 91 05 132 U1 | 6/1991 |
| DE | 10260694 | 6/2004 |
| DE | 10 2006 009 923 | 9/2007 |
| EP | 0 712 09 | 2/1983 |

(56) References Cited

FOREIGN PATENT DOCUMENTS

| EP | 0 748 889 | 12/1996 |
|---|---|---|
| EP | 0 876 524 | 10/2003 |
| EP | 1 686 210 | 11/2013 |
| JP | 04-327272 | 11/1992 |
| JP | 06-018099 | 1/1994 |
| JP | 06-048099 | 2/1994 |
| JP | 08-049143 | 2/1996 |
| WO | WO-99/35434 | 7/1999 |
| WO | WO-2005/052235 | 6/2005 |
| WO | WO-2005/124063 | 12/2005 |
| WO | WO-2007/144559 | 12/2007 |
| WO | WO-2007/147062 | 12/2007 |
| WO | WO-2008/134604 | 11/2008 |
| WO | WO-2009/115654 | 9/2009 |
| WO | WO-2010/086618 | 8/2010 |
| WO | WO-2013/067034 | 5/2013 |

OTHER PUBLICATIONS

Celanese Acetate, Mesh definition, Complete Textile Glossary, 2001, 3 pages.
Communication pursuant to Rule 114(2) EPC for EP Application No. 12783816, dated Feb. 24, 2015, 4 pages.
International Search Report and Written Opinion for International Application No. PCT/US2012/062831, mailed Mar. 21, 2013, 11 pages.
International Search Report and Written Opinion for PCT Application No. PCT/GB2007/001795, mailed Nov. 30, 2007, 10 pages.
International Search Report and Written Opinion for PCT Application No. PCT/GB2010/000156, mailed Oct. 28, 2010, 14 pages.

NONWOVEN CEMENTITIOUS COMPOSITE FOR IN-SITU HYDRATION

CROSS-REFERENCE TO RELATED PATENT APPLICATIONS

This application is a continuation of U.S. patent application Ser. No. 14/185,610, filed Feb. 20, 2014, which claims the benefit of U.S. Provisional Patent Application No. 61/877,857, filed Sep. 13, 2013, and is a continuation-in-part of International Application No. PCT/US2012/062831, filed Oct. 31, 2012, which claims the benefit of U.S. Provisional Patent Application No. 61/554,377, filed Nov. 1, 2011 and U.S. Provisional Patent Application No. 61/703,618, filed Sep. 20, 2012, all of which are incorporated herein by reference in their entireties.

BACKGROUND

The present Application relates to composite materials, including textile- and fiber-reinforced cementitious composites. Specifically, the present Application relates to a flexible pre-fabricated textile and fiber reinforced cementitious composite capable of in-situ hydration (i.e. in place, on location, on a construction site, etc.). In-situ hydration allows for a liquid to be topically applied and react with a volume of cementitious material within the composite. This reaction occurs while the composite is in position and does not disturb the pre-fabricated nature of the composite. Such a cementitious composite material allows cementitious material to set and harden within the composite without requiring traditional mixing procedures.

Traditional textile-reinforced composites typically include at least one layer of a two-dimensional textile and a layer of concrete to form a laminated composite. Such laminated composites may exhibit excellent in-plane properties but poor inter-laminar properties due to a lack of reinforcement in the thickness direction (i.e. a direction orthogonal to a surface of the composite) or weak bonding of the layers. This deficiency exposes the composite to the possibility of damage or delamination when experiencing inter-laminar stresses. While traditional composites include plain weave fabrics or multiple layers of fabric to improve performance, these systems may still fail easily under loading.

Other cementitious composites include woven or knitted three-dimensional textiles configured to entrap cementitious material between two layers. Such woven or knitted three-dimensional textiles may not independently function to secure cementitious materials for in-situ hydration. These woven or knitted layers may need to be formed between other layers before they can entrap cementitious materials.

SUMMARY

One embodiment of the present disclosure relates to a cementitious composite material for in-situ hydration that includes a first layer having a nonwoven configuration and a cementitious material disposed within the first layer. The first layer has a first side and an opposing second side, and the first layer includes a plurality of discrete nodes spaced relative to one another along a first direction and a second direction. The cementitious composite material further includes a second layer disposed along the first side of the first layer and a third layer disposed along the opposing second side of the first layer and configured to prevent at least a portion of the plurality of cementitious particles from migrating out of the first layer. The cementitious material includes a plurality of cementitious particles, the first layer and the second layer include flexible materials, and the second layer is coupled to the first layer at the plurality of discrete nodes.

Another exemplary embodiment of the present disclosure relates to a cementitious composite material for in-situ hydration that includes a mesh layer having a nonwoven configuration and defining a plurality of spaces configured to receive particles, the plurality of spaces each having a size of between 0.5 microns and three millimeters. The mesh layer includes a plurality of discrete nodes spaced relative to one another along a first direction and a second direction. The cementitious composite material further includes a cementitious material in a pre-hydration condition disposed within the mesh layer and having particles sized to pass through and into the plurality of spaces, a sealing layer disposed along a first side of the mesh layer, and a containment layer disposed along an opposing second side of the mesh layer and configured to prevent at least some of the cementitious material from migrating out of the mesh layer. The mesh layer and the sealing layer include flexible materials, and the sealing layer is coupled to the mesh layer at the plurality of discrete nodes.

Yet another exemplary embodiment of the present disclosure relates to a cementitious composite material for in-situ hydration that includes a mesh layer having a nonwoven configuration and a cementitious material disposed within the mesh layer. The mesh layer has a first side and an opposing second side, and the mesh layer includes a plurality of discrete nodes spaced relative to one another along a first direction and a second direction. The cementitious composite material further includes a sealing layer disposed along the first side of the mesh layer and a containment layer disposed along the opposing second side of the mesh layer and configured to prevent at least a portion of the plurality of cementitious particles from migrating out of the mesh layer. The cementitious material includes a plurality of cementitious particles, the mesh layer and the sealing layer include flexible materials, and the sealing layer is coupled to the mesh layer at the plurality of discrete nodes.

BRIEF DESCRIPTION OF THE DRAWINGS

The disclosure will become more fully understood from the following detailed description taken in conjunction with the accompanying drawings wherein like reference numerals refer to like elements, in which.

DETAILED DESCRIPTION

Before turning to the figures which illustrate the exemplary embodiments in detail, it should be understood that the application may be not limited to the details or methodology set forth in the description or illustrated in the figures. It should also be understood that the terminology may be for the purpose of description only, and should not be regarded as limiting.

Composite Layers

Nonwoven cementitious composite materials may provide enhanced structural performance relative to concrete reinforced with traditional materials (e.g., fibers, rebar, etc.), traditional unidirectional textile reinforced concrete composites, and woven or knitted three dimensional textile concrete composites. Nonwoven cementitious composites include a dry cementitious mixture embedded in, or contained by, a structural layer that enables the cementitious material to undergo its normal setting and strength gain process after in-situ hydration to produce a rigid composite. Such a nonwoven structural layer may be independently formed and include interlocking fibers that form a freestanding material. Nonwoven cementitious composites may provide a solution that has improved structural performance per equal unit of volume, is lower cost, reduces labor costs, and requires less processing than traditional concrete or concrete composites. Further, the nonwoven fibers improve load bearing capabilities by distributing the energy of a load across the fibers. The nonwoven fibers also bridge crack faces in the cementitious phase to provide improved crack resistance and localize cracking to reduce crack propagation.

Figure 1:
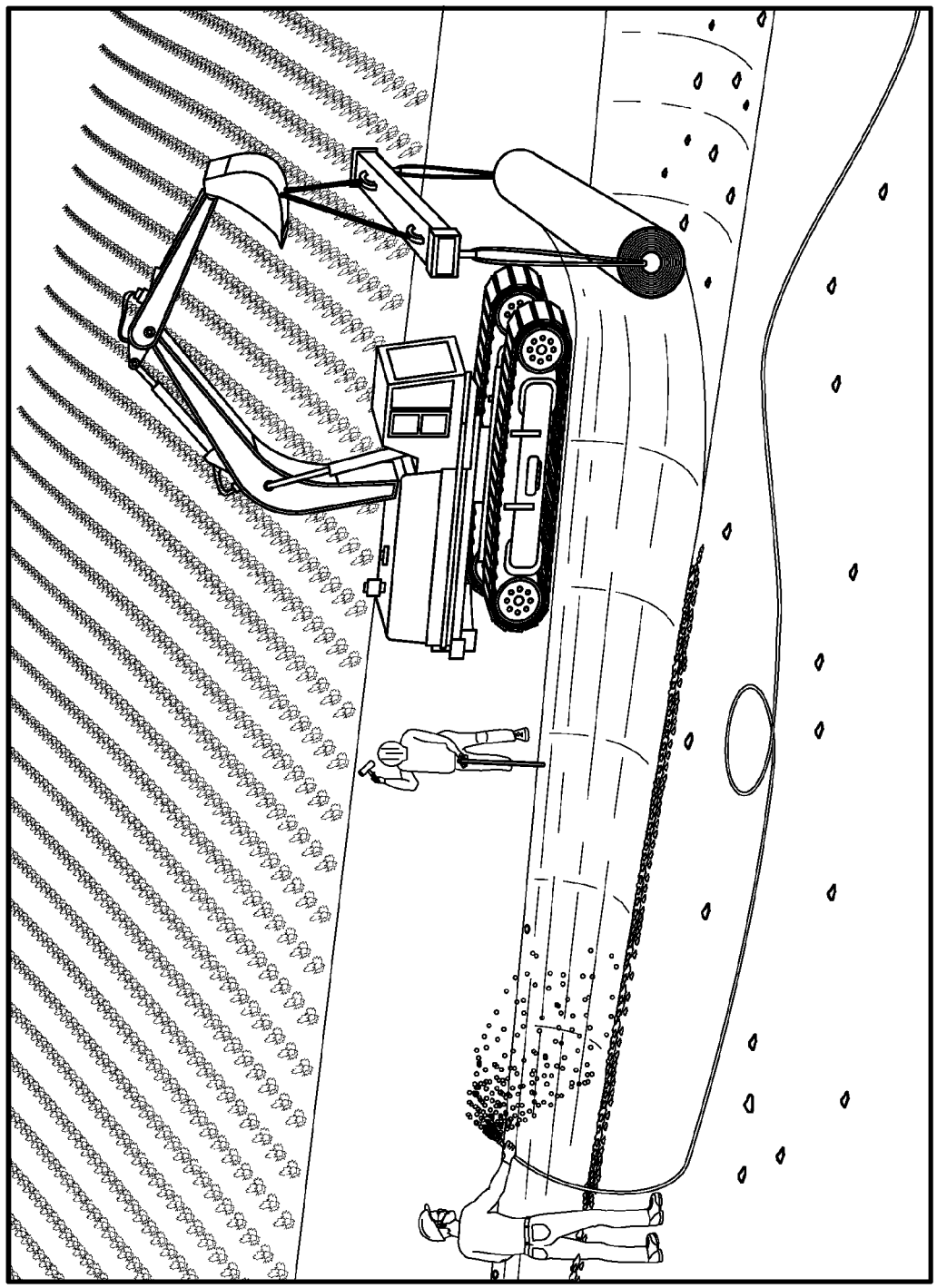
FIG. 1 is a perspective view of operators installing a nonwoven cementitious composite in a canal lining application.

Hydration of nonwoven cementitious composites may be initiated in-situ (i.e. in place, on a job site, etc.). Therefore, the nonwoven cementitious composite may be transported to a location (e.g., canal, etc.) as a flexible composite material in a pre-packaged configuration (e.g., sheets, rolls, etc.) and hydrated on location. Such nonwoven cementitious composite materials may provide commercial, water conservation, and operational benefits. By way of example, nonwoven cementitious composites may be applied to form a canal lining, as shown in FIG. 1. Other applications for nonwoven cementitious composites may include the following: low to high flow channels, open-channel water conveyance canals, irrigation and drainage ditches, swales, culverts, jetties, groins, dikes, levees, reservoirs, check dams, interceptor ditches, horizontal drains, stream restoration and storm water management, seawall and bulkhead scour protection, landfill layering and capping, brown field layering and capping, mine shaft reinforcement, structural reinforcement, airfield or helipad construction, boat launch ramps, column and beam reinforcement, pipe repair, oilfield lining, holding basins, pond lining, pit lining, waste water lagoon lining, slope fortification, snow basin fortification, tieback fortification, berm lining, beach and shoreline restoration, as a road surface, driveways, sidewalks and walkways, form work lining, concrete waterproofing, a material for homes or other structures, landscaping, foundation linings, flooring, pool construction, patio construction, roofs, insulation and weatherproofing, as a replacement for stucco, for noise attenuation, and for retaining wall and embankment construction, among other applications.

Figure 2:
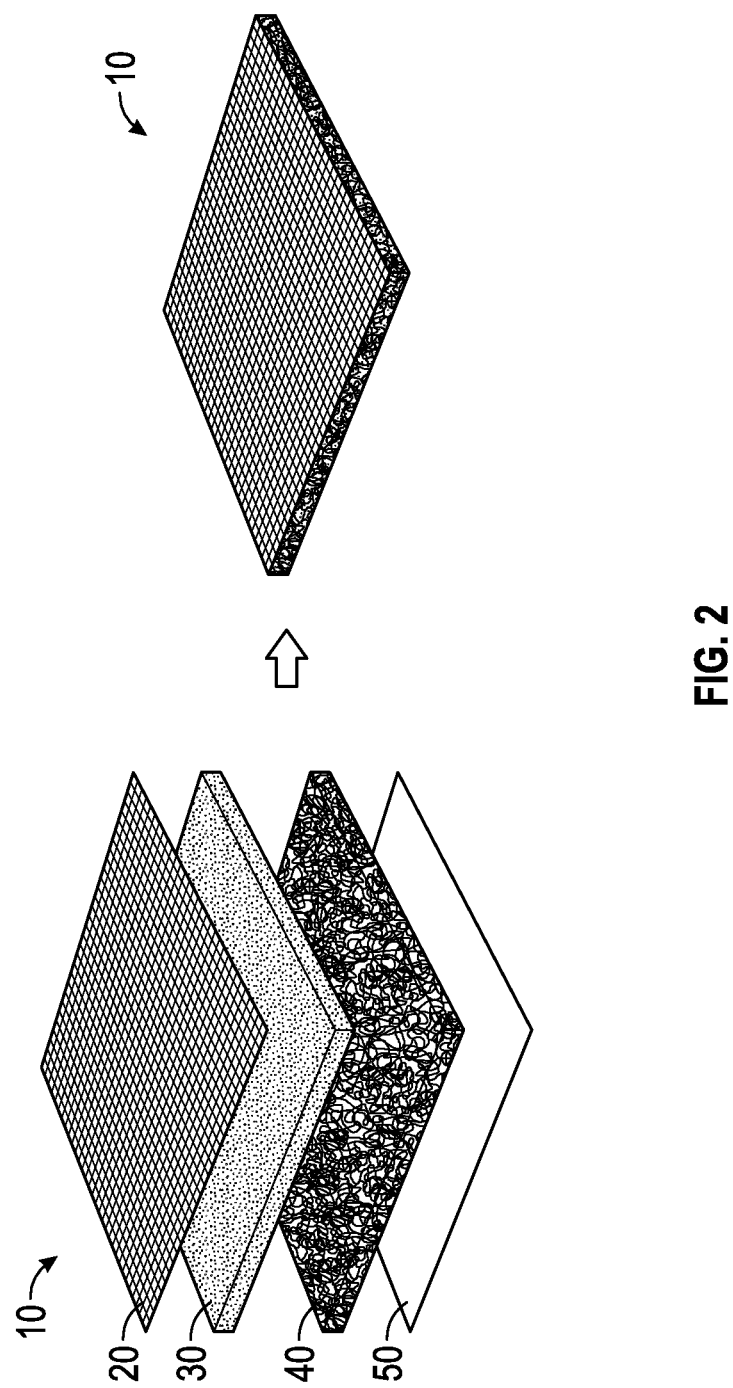
FIG. 2 is an exploded perspective view of a flexible nonwoven cementitious composite.

According to the exemplary embodiment shown in FIG. 2, a composite, shown as nonwoven cementitious composite 10, includes a plurality of layers. As shown in FIG. 2, such layers include a containment layer, shown as permeable layer 20, a cementitious layer, shown as cementitious layer 30, a three dimensional volume layer (i.e. mesh), shown as structure layer 40, and an impermeable (e.g., sealing) layer, shown as impermeable layer 50. According to an exemplary embodiment, permeable layer 20, cementitious layer 30, structure layer 40, and impermeable layer 50 may be disposed adjacent to one another and assembled into a sheet to form nonwoven cementitious composite 10. As shown in FIG. 2, structure layer 40 may be sandwiched between permeable layer 20 and impermeable layer 50. According to an exemplary embodiment, nonwoven cementitious composite 10 may have a thickness of between five millimeters and one hundred millimeters pre-hydration. However, the thickness of nonwoven cementitious composite 10 may exceed 2.0 inches post-in-situ hydration when, by way of example, additives are included in cementitious layer 30 (e.g., expansive cement, etc.). According to an exemplary embodiment, nonwoven cementitious composite 10 does not include a permeable layer 20 or an impermeable layer 50 but does include a structure layer 40 that contains cementitious layer 30. As discussed in more detail below, it has been experimentally confirmed that cementitious layer 30 is capable of hardening within structure layer 40 without the use of a containment layer, such as permeable layer 20. Such a composite may include a structure layer 40 designed to control the flow of water into and out of the composite. According to an exemplary embodiment, control of water into nonwoven cementitious composite 10 may be performed by coupling other layers to structure layer 40.

According to an exemplary embodiment, nonwoven cementitious composite 10 includes layers that are coupled together. Such coupling may reduce the relative movement between the layers pre-hydration (e.g., during the manufacturing process, during transportation, during installation, etc.). By way of example, impermeable layer 50 may be coupled (e.g., fused, integrally formed, welded, adhesively secured, melted, etc.) with structure layer 40. According to an exemplary embodiment, permeable layer 20 is coupled with structure layer 40. Such coupling may improve the structural characteristics of nonwoven cementitious composite 10 by facilitating load transfer between permeable layer 20 and structure layer 40. According to an exemplary embodiment, coupling structure layer 40 with permeable layer 20 or impermeable layer 50 may improve the structural characteristics of nonwoven cementitious composite 10 by facilitating load transfer between the layers.

According to an alternative embodiment, the nonwoven cementitious composite is heated after cementitious layer 30 is disposed within structure layer 40 to fuse (e.g., shrink wrap, compress, etc.) structure layer 40. By way of example, nonwoven structure layer 40 may begin as 1.0 inch thick having 0.5 inches of cementitious layer 30 disposed within it. After heating, structure layer 40 may shrink to 0.5 inches thick. According to an exemplary embodiment, a portion of structure layer 40 (e.g., the fused portion) may replace permeable layer 20, impermeable layer 50, or both permeable layer 20 and impermeable layer 50.

Figure 3:
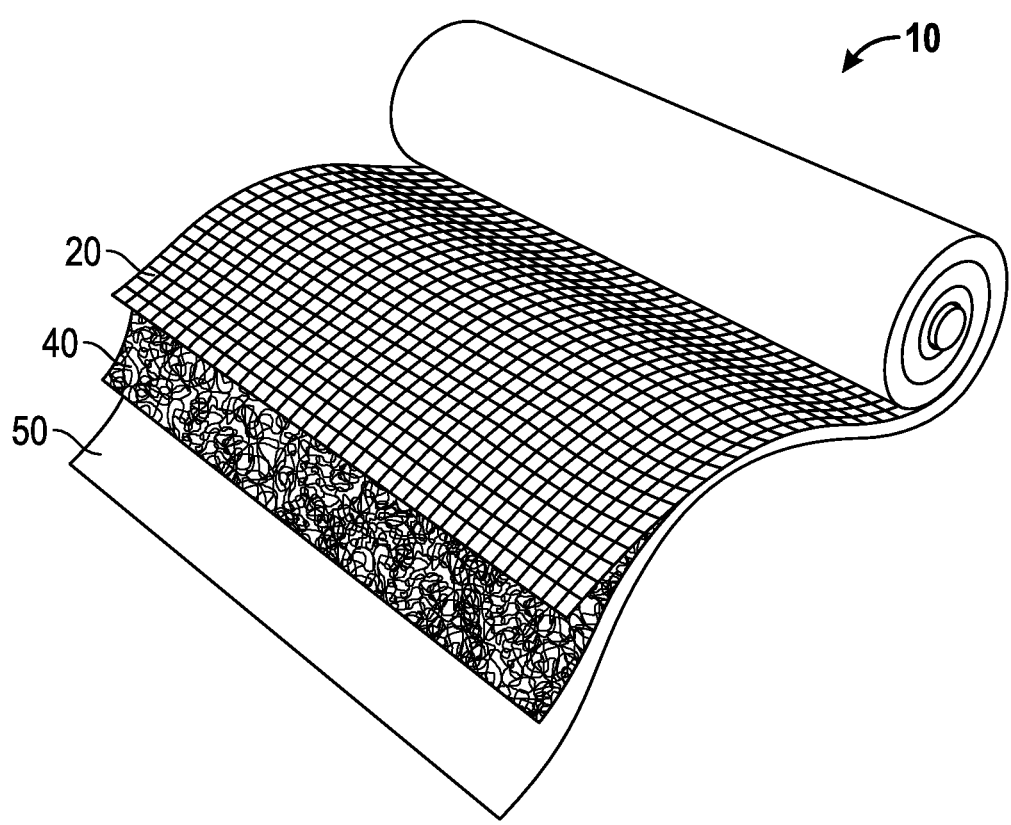
FIG. 3 is a perspective view of a rolled nonwoven cementitious composite.

Referring next to the exemplary embodiment shown in FIG. 3, nonwoven cementitious composite 10 may be arranged in a flexible sheet. As shown in FIG. 3, permeable layer 20, structure layer 40, and impermeable layer 50 are each flexible and disposed adjacent to one another. According to an exemplary embodiment, such a combination of flexible layers allows nonwoven cementitious composite 10 to be rolled to facilitate transportation and reduce the amount of cementitious material that migrates through permeable layer 20. According to an alternative embodiment, nonwoven cementitious composite 10 may be arranged in another configuration (e.g., various sheets that may be stacked, a sheet having a preformed shape, etc.).

According to an alternative embodiment, the nonwoven cementitious composite may include a different plurality of layers. By way of example, the nonwoven cementitious composite may include an impermeable layer, a structural layer, and a cementitious layer that includes a mixture of cementitious materials. Such a composite may utilize the structural layer to retain the cementitious material, may include a removable layer to retain the cementitious material during transport and in the application of composite 10, or may include another system designed to retain the cementitious material. According to various alternative embodiments, nonwoven cementitious composite 10 may include permeable layer 20 and impermeable layer 50, only impermeable layer 50, only permeable layer 20, or neither permeable layer 20 nor impermeable layer 50.

According to still another alternative embodiment, the nonwoven cementitious composite may include cutout voids extending entirely through the nonwoven cementitious composite. By way of example, the cutout voids may allow a fluid to drain through the composite after hardening. A nonwoven cementitious composite having cutout voids may be produced by forming voids in the structural or other layers either before or after manufacturing the composite. According to an exemplary embodiment, the cutout voids can be formed in any shape (e.g., triangle, circle, oval, diamond, square, rectangle, octagon, etc.). The volume of the composite removed to form the cutout voids may define between one and ninety percent of the total composite volume.

Structure Layer

According to an exemplary embodiment shown in FIGS. 2-8, structure layer 40 comprises a three dimensional material having specific characteristics designed to facilitate the operation of nonwoven cementitious composite 10. By way of example, such characteristics of structure layer 40 may include low density, high void space, and discontinuities, among other characteristics. In one embodiment, structure layer 40 is an independent structural material configured to support the weight of cementitious layer 30 thereby reducing the possibility of pre-hydration delamination (e.g., separation of structure layer 40 from impermeable layer 50, etc.) while improving the strength of the nonwoven cementitious composite 10 post-hydration. By way of example, structure layer 40 may be able to independently support a cementitious mix having a weight of between one and five pounds per square foot. These characteristics improve the strength and transportability, among other features, of nonwoven cementitious composite 10. It has been observed that the structure layer 40 having strands arranged in a nonwoven configuration also reduces the prevalence and severity of shrink cracking within cementitious layer 30. Such a reduction may be produced because the nonwoven fibers limit crack propagation by bridging crack faces within the cementitious phase. In one embodiment, structure layer 40 forms a mat having a first side (e.g., a bottom side) and an opposing second side (e.g., a top side). The top side and the bottom side may be separated by the thickness of structure layer 40. In one embodiment, structure layer 40 has a thickness of between five millimeters and one hundred millimeters, for example, 15 millimeters.

Figure 4A:
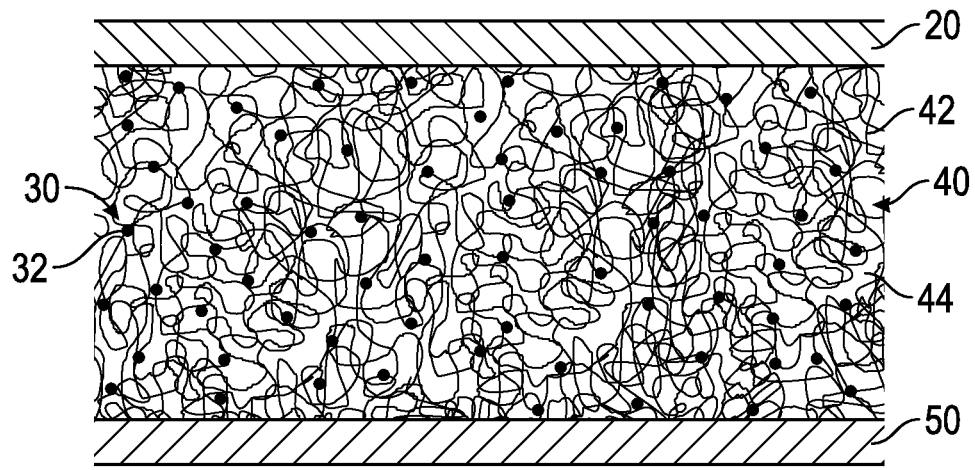
FIGS. 4A-4B are schematic cross-sectional views of a nonwoven cementitious composite.
Figure 4B:
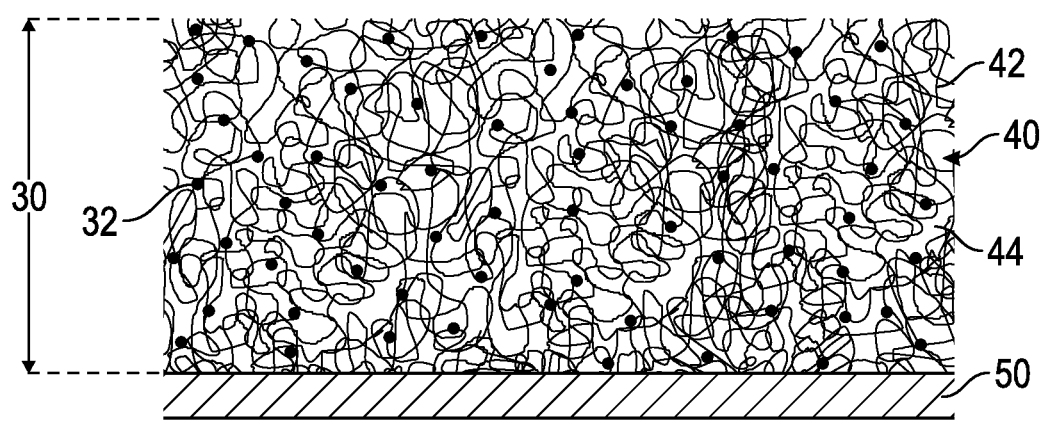

Referring to the exemplary embodiment shown in FIGS. 4A-4B, structure layer 40 includes a plurality of fibers, shown as strands 42. As shown in FIGS. 4A-4B, strands 42 are arranged in a nonwoven configuration (e.g., randomly distributed, systematically arranged, arranged in a specified pattern, distributed non-uniformly, etc.). Strands 42 may be curled, randomly configured, or otherwise shaped such that strands 42 frequently change directions relative to one another and have various relative orientations. In one embodiment, strands 42 are discontinuous. In other embodiments, strands 42 are continuous and may be extruded (e.g., as a continuous filament) or otherwise disposed to form structure layer 40. By way of example, strands 42 may be longer and thicker (e.g., a cross-sectional thickness of greater than twenty microns, etc.) than fibers associated with felt or wadding. Strands 42 may be coupled where they intersect, overlap, or otherwise interface with one another. According to an exemplary embodiment, structure layer 40 comprises a lofty, open mat material (e.g., a scouring pad manufactured from silicon carbide, aluminum oxide, nylon, etc.). Such open mat materials are discussed in U.S. Pat. Nos. 2,958,593; 3,537,121; and 4,437,271, which are incorporated herein by reference in their entirety. In one embodiment, structure layer 40 includes at least one of an erosion control or drainage mat (e.g., Enkamat® manufactured by Colbond®, etc.), a tri-axial geonet (e.g., Tenflow Geocomposite® or Duraflow Geocompoiste® manufactured by GSE Environmental®, etc.), a bi-planar geonet (e.g., PermaNet® manufactured by GSE Environmental®, etc.), and a tri-planar geonet (e.g., TenDrain Geocomposite® manufactured by GSE Environmental®, etc.). According to an exemplary embodiment, the distances between non-overlapping strands 42 are between approximately half a micron and several millimeters. In other embodiments, nonwoven cementitious composite 10 includes a concrete protective liner (e.g., StudLiner® manufactured by GSE Environmental®, Sure Grip® manufactured by Agrusafe®, Carbofix® manufactured by Prose Kunstsoffen B.V.®, etc.) that includes studs in place of strands 42. By way of example, the studs may protrude (e.g., vertically, diagonally, etc.) from impermeable layer 50. In one embodiment, the studs are integrally formed with impermeable layer 50. In other embodiments, the studs are otherwise coupled to impermeable layer 50.

As shown in FIGS. 4A-4B, structure layer 40 includes an interstitial volume (e.g., open volume, void volume, etc.), shown as void 44, formed within structure layer 40 and defined by the interstitial volume between strands 42. According to an exemplary embodiment, void 44 represents between 80 and 99.8 percent by volume of structure layer 40. According to an alternative embodiment, void 44 represents between 95 and 99.8 percent by volume of structure layer 40. The volume of structure layer 40 that is comprised of void 44 impacts the density, weight, and other characteristics of structure layer 40 and nonwoven cementitious composite 10.

Referring still to the exemplary embodiment shown in FIGS. 4A-4B, cementitious layer 30 is disposed within at least a portion of void 44 of structure layer 40. As shown in FIGS. FIGS. 4A-4B, cementitious layer 30 includes a plurality of constituents, shown as particles 32. In one embodiment, particles 32 include a plurality of cementitious particles. According to an exemplary embodiment, cementitious layer 30 is positioned within void 44 using physical gravity, vibration, compaction, or any combination of gravity, vibration, and compression. The extent that cementitious layer 30 is compacted may impact the ability of water to flow through cementitious layer 30, the time required for hydration, setting, and hardening of cementitious layer 30, the strength of nonwoven cementitious composite 10, and the likelihood that cementitious material will migrate through permeable layer 20. It has been experimentally confirmed that a denser structure layer 40 reduces the loss of cementitious layer 30 during the transportation and handling of nonwoven cementitious composite 10.

According to the embodiment shown in FIG. 4A, particles 32 of cementitious layer 30 substantially fill void 44. As shown in FIG. 4A, permeable layer 20 is positioned along a surface of cementitious layer 30 and structure layer 40. According to an alternative embodiment, at least a portion of structure layer 40 is exposed (e.g., at least a portion of one or more strands 42 is exposed) thereby forming an exposed portion of structure layer 40. In one embodiment, the exposed portion protrudes from cementitious layer 30. As shown in FIG. 4B, various strands 42 protrude (e.g., 0.5 millimeters, 1 millimeter, 2 millimeters, etc.) from cementitious layer 30. A portion of each strand 42 may protrude from cementitious layer 30 or portions of a subset of strands 42 may protrude from (e.g., vertically, from the sides of, etc.) from cementitious layer 30, according to various exemplary embodiments. The lengths of strands 42 protruding from cementitious layer 30 may define the exposed portion of structure layer 40. According to one embodiment, the exposed portion of structure layer 40 includes strands 42 extending vertically (e.g., from the top of) and horizontally (e.g., from the side of) cementitious layer 30. Such strands 42 may be disposed in a random arrangement and extend in various directions from cementitious layer 30. In other embodiments, structure layer 40 has a defined pattern (e.g., diagonally intersecting, honeycomb, etc.), permeable layer 20 being coupled to according to a corresponding bonding pattern. The exposed portion may facilitate the bonding of various other layers of nonwoven cementitious composite 10 to structure layer 40.

In one embodiment, permeable layer 20 is bonded to the exposed portion of structure layer 40 (i.e. permeable layer 20 is bonded to the lengths of strands 42 protruding from cementitious layer 30). By way of example, permeable layer 20 may be bonded using heat (e.g., heat welded, melted, bonded in a furnace, etc.), an adhesive, a chemical reaction, an intermediate coupling material, or still another process. In one embodiment, the exposed portion of structure layer 40 is cleaned (e.g., with pressurized air, with a brush, etc.) to remove cementitious material or other debris from the exposed portion of structure layer 40 prior to bonding. In another embodiment, cementitious layer 30 is compacted within structure layer 40 (e.g., uniformly, evenly, etc.), thereby reducing dust and the prevalence of cementitious material on the exposed portion of structure layer 40.

Figure 4C:
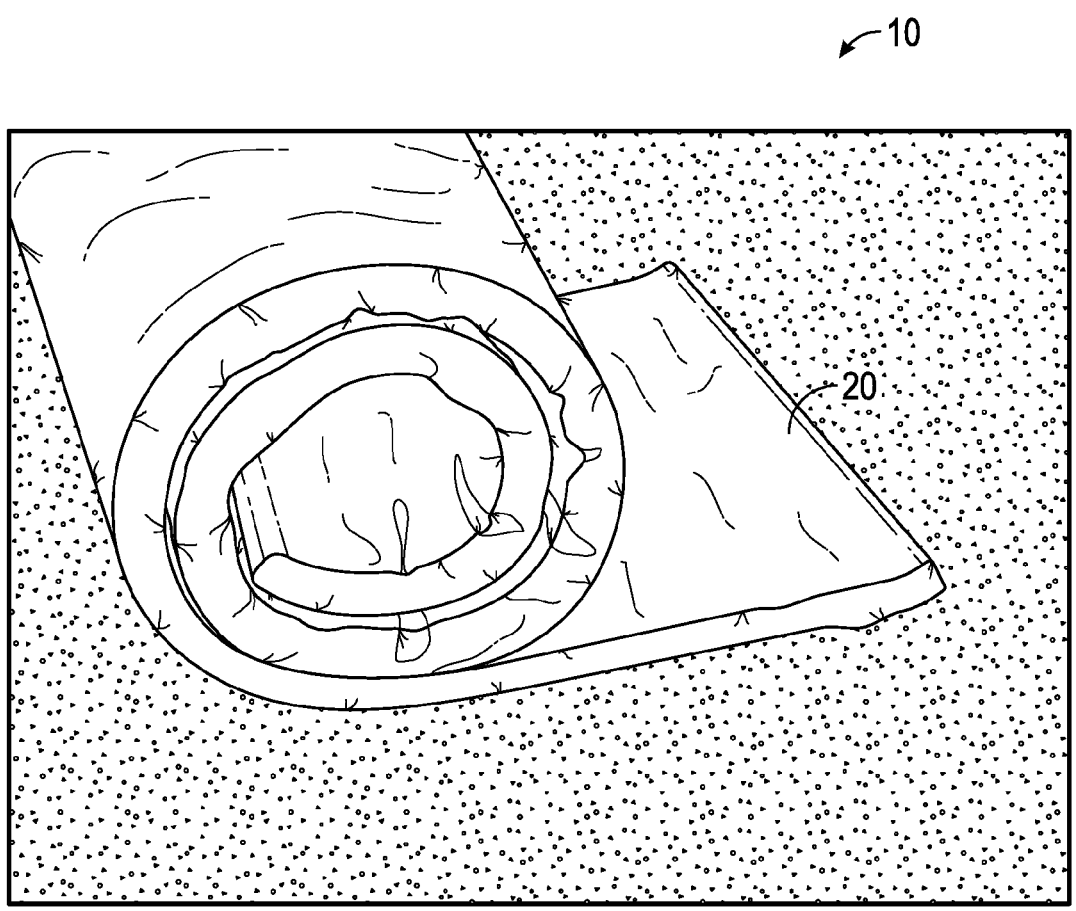
FIG. 4C is a perspective view of a rolled nonwoven cementitious composite having a permeable layer that includes a water soluble fabric.

According to the exemplary embodiment shown in FIG. 4C, permeable layer 20 includes a water soluble material (e.g., a cold water soluble material). In some embodiments, the water soluble material is a fabric material or a film material, and such fabric material may be woven or nonwoven. In one embodiment, the fabric material is a cold water soluble nonwoven material manufactured from partially hydrolyzed polyvinyl alcohol fibers (a PVA fabric). The PVA fabric may be impermeable to cementitious material, thereby reducing the migration of cementitious layer 30 from nonwoven cementitious composite 10. In some embodiments, the PVA fabric is permeable to water. In other embodiments, the PVA fabric substantially retains water until the water soluble material disintegrates. In still other embodiments, the PVA fabric is substantially impermeable to water until the water soluble material disintegrates. According to an exemplary embodiment, permeable layer 20 has a surface (e.g., a nonwoven surface) having a roughness selected to facilitate bonding (e.g., a large surface roughness such that strands 42 better deform into the face of permeable layer 20). According to another exemplary embodiment, permeable layer 20 is treated with a coating to facilitate bonding (e.g., a fusible water soluble embroidery stabilizer, "Wet N Gone Fusible®", etc.).

According to an exemplary embodiment, the PVA fabric is bonded to the exposed portion of structure layer 40 with heat. In one embodiment, the PVA fabric has a melting point that is greater than the melting point of structure layer 40. By way of example, the PVA fabric may have a melting point of between 356 and 374 degrees Fahrenheit. In one embodiment, structure layer 40 is manufactured from a polypropylene material having a melting point of between 266 and 340 degrees Fahrenheit. Permeable layer 20 (e.g., a PVA fabric) may be placed in contact with the lengths of strands 42 protruding from cementitious layer 30. Heat may be subsequently applied (e.g., topically) to permeable layer 20 (e.g., with a heated roller, with a heated air stream, with a hot plate, with a furnace, etc.) to melt structure layer 40 without melting permeable layer 20, thereby bonding permeable layer 20 with structure layer 40. By way of example, the applied heat may deform the lengths of strands 42 protruding from cementitious layer 30 into permeable layer 20 (e.g., a PVA fabric). The lengths of strands 42 within cementitious layer 30 may remain intact (i.e. may not melt) even after the application of heat. Melting the exposed portion of structure layer 40 may form a void (e.g., the volume within which the exposed portion was previously positioned). In one embodiment, permeable layer 20 is positioned in the void left by the exposed portion of structure layer 40. The permeable layer 20 may be in contact with cementitious layer 30 (e.g., may fuse against cementitious layer 30) after heating, thereby retaining cementitious layer 30 and restricting movement of cementitious material within nonwoven cementitious composite 10. Positioning permeable layer 20 within the void left by the melted exposed portion of structure layer 40 may be facilitated by the application of pressure (e.g., with a roller, with a plate, etc.) simultaneously with or after the bonding process. By way of example, a heated roller or plate may be used to both heat permeable layer 20 and compact permeable layer 20. By way of another example, a temperature neutral roller or a cooled roller may be used to compact permeable layer 20 after the application of heat. Such an additional roller may also cool permeable layer 20. According to an alternative embodiment, the PVA fabric has a melting point that is less than or equal to the melting point of structure layer 40.

In one embodiment, permeable layer 20 is positioned along a top surface of structure layer 40. According to another embodiment, permeable layer 20 is positioned along a top surface and at least one side surface of structure layer 40. Permeable layer 20 may be bonded with only the top surface of structure layer 40, bonded with only at least one side surface of structure layer 40, or along both the top surface and at least one side surface of structure layer 40, according to various alternative embodiments. According to another embodiment, permeable layer 20 is bonded with impermeable layer 50. By way of example, permeable layer 20 may include a material having a first melting point (e.g., PVA having a melting point of between 356 and 374 degrees Fahrenheit), and impermeable layer 50 may include a material having a second melting point (e.g., a polypropylene material having a melting point of between 266 and 340 degrees Fahrenheit). In one embodiment, the first melting point is greater than the second melting point such that the application of heat to the seam between permeable layer 20 and impermeable layer 50 melts impermeable layer 50 to form a bond without melting permeable layer 20. In another embodiment, the second melting point is greater than the first melting point such that the application of heat to the seam between permeable layer 20 and impermeable layer 50 melts permeable layer 20 to form a bond without melting impermeable layer 50. In still another embodiment, permeable layer 20 and impermeable layer 50 have the same melting point. In yet another alternative embodiment, the application of heat melts a coupling material (e.g., a material having a melting point below that of permeable layer 20 and impermeable layer 50) to form a bond.

Permeable layer 20 may abut or partially overlap impermeable layer 50. By way of example, impermeable layer 50 may include a flange extending laterally outward from structure layer 40, and permeable layer 20 may extend down the sides of structure layer 40 and along the flange of impermeable layer 50. Such overlap may facilitate bonding the two layers together. In one embodiment, permeable layer 20 is bonded to impermeable layer 50, thereby forming a sealed pocket that envelopes cementitious layer 30 and structure layer 40.

Nonwoven cementitious composite 10 may be positioned and hydrated in-situ. According to an exemplary embodiment, permeable layer 20 is a water soluble material (e.g., PVA fabric). After installation of nonwoven cementitious composite 10, an operator may apply water topically to hydrate cementitious layer 30. In one embodiment, the water soluble material prevents displacement of cementitious layer 30 (i.e. prevents the cementitious material from washing away) until the water soluble material disintegrates. Such protection may facilitate the use of higher-pressure water sources during the hydration process. A disintegration time for the water soluble material may be selected to facilitate hydration. By way of example, the disintegration time may be less than one minute. According to an exemplary embodiment, water soluble material is positioned along the sides of structure layer 40 such that, upon application of water, the water soluble fabric disintegrates. Upon the application of water, the cementitious material begins its initial setting period. In one embodiment, cementitious material positioned along the water soluble material may begin to lock, set, or "gel" within structure layer 40 to prevent washout of the mix (e.g., the cementitious material positioned along a middle portion of cementitious layer 30). In another embodiment, the mix of cementitious material within cementitious layer 30 is designed partially diffuse such that a small portion of the mix flows laterally outward before or during the initial setting. Such lateral flow may facilitate the coupling of adjacent panels or rolls of nonwoven cementitious composite 10 (e.g., panels or rolls positioned along one another, panels or rolls touching one another, panels or rolls spaced two millimeters or another distance from one another, etc.). By way of example, the cementitious material along the permeable layers of two adjacent panels may begin to gel during the initial setting period and bond together, thereby fusing the adjacent panels or rolls. By way of another example, cementitious material from adjacent panels or rolls may mix together and harden to form a rigid joint. In some embodiments, the composition of cementitious layer 30 is designed to facilitate such lateral coupling. In one embodiment, the water soluble material facilitates the transport of water into the composite. By way of example, the water soluble material may include apertures to facilitate water flow, a woven configuration that transports the water into cementitious layer 30, or still another structure. By way of another example, the surface of cementitious layer 30 positioned along the water soluble material may begin to gel and retain (e.g., reduce the migration of, contain, limit movement of, etc.) the cementitious material positioned within a middle portion of cementitious layer 30 or facilitate the flow of water into cementitious layer 30. The cementitious material within cementitious layer 30 may be activated during and following the disintegration process of the water soluble material. After the disintegration time, nonwoven cementitious composite 10 has a bare surface (e.g., cementitious layer 30 is exposed after hardening).

According to an exemplary embodiment, structure layer 40 supports (i.e., holds, contains, reinforces, etc.) cementitious layer 30. By way of example, strands 42 of structure layer 40 may physically support cementitious layer 30 within void 44. Modifying the size, shape, or orientation of strands 42 that support cementitious layer 30 may improve the structural properties or hydration characteristics of nonwoven cementitious composite 10. By way of example, a slightly less open space (e.g., where void 44 is between 80 and 95 percent by volume of structure layer 40) with more densely arranged strands 42 may improve the strength of structure layer 40 but make it harder to fill, which may reduce the efficiency of manufacturing non-woven cementitious composite 10.

According to an alternative embodiment, the density of structure layer 40 transitions (i.e., changes) in at least one of the lateral, the longitudinal, and the thickness direction. In one embodiment, structure layer 40 includes a more open interstitial volume (e.g., between 95 and 99.8 percent of structure layer 40) formed at an interior portion of structure layer 40 and less open interstitial volume (e.g., between 80 and 95 percent of structure layer 40) formed towards the outer portions of structure layer 40 (i.e. a denser portion of structural material along the outsides of structure layer 40). In any embodiment having a changing density, the transition may be uniform or non-uniform. According to an exemplary embodiment, a portion of structure layer 40 (e.g., the denser portions) may supplement or replace permeable layer 20, impermeable layer 50, or both permeable layer 20 and impermeable layer 50.

According to an alternative embodiment, structure layer 40 includes void patterns (e.g., shapes cut through structure layer 40, three dimensional voids formed within structure layer 40, etc.). Such void patterns may be formed in structure layer 40 through cutting, forming, or another process. The void patterns may be formed during the primary manufacturing of structure layer 40 or subsequently as a secondary manufacturing process. According to an exemplary embodiment, the void patterns are randomly distributed or formed in sequence (e.g., a honeycomb, etc.). The void patterns may decrease the time required to dispose cementitious layer 30 in structure layer 40, improve the physical properties of composite 10 after in-situ hydration, or provide other advantages.

Figure 5:
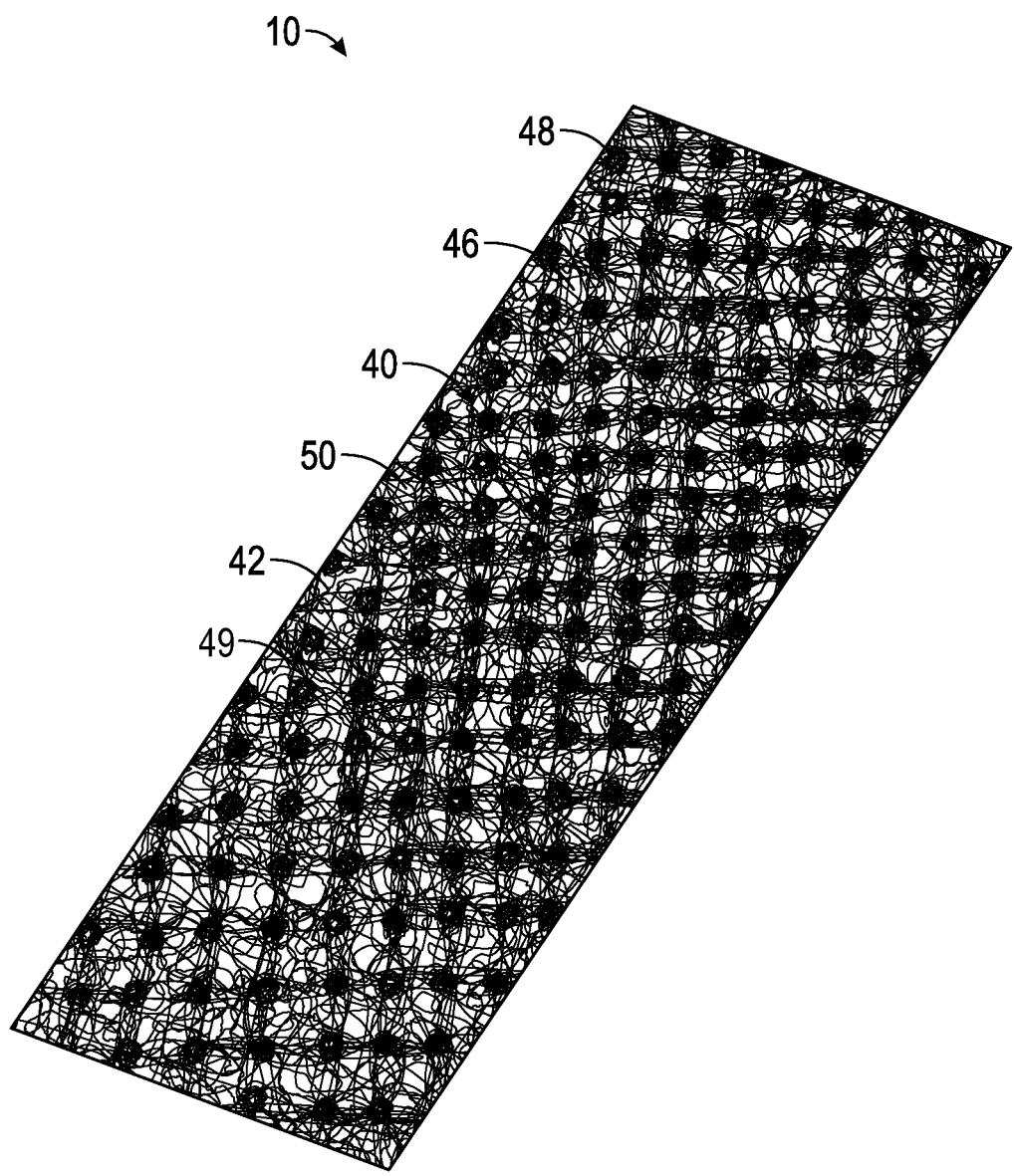
FIG. 5 is a perspective view of a mesh layer and a sealing layer for a nonwoven cementitious composite.
Figure 6:
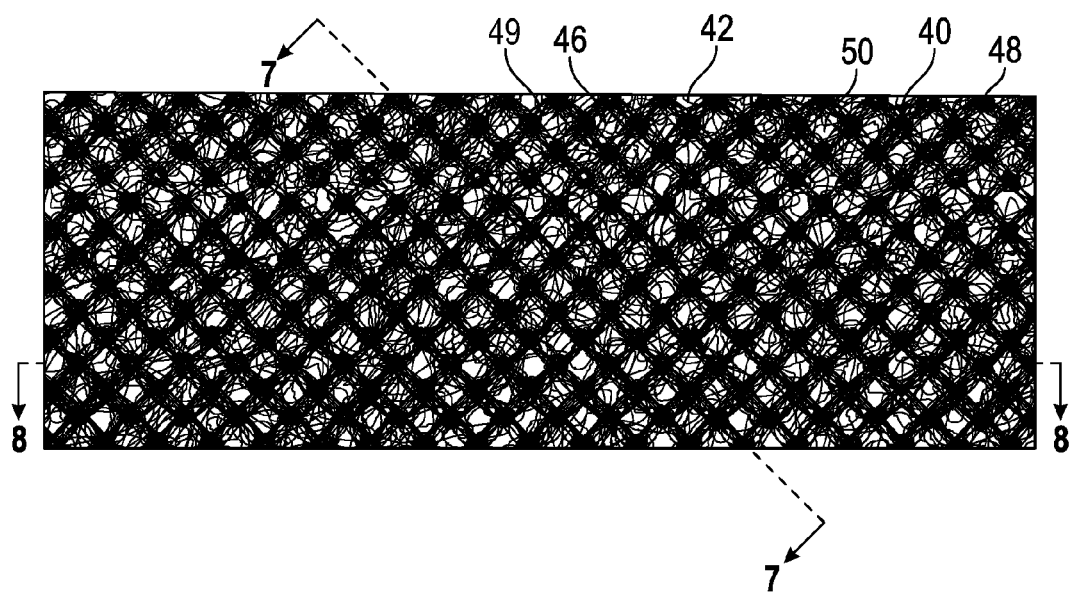
FIG. 6 is a top plan view of a mesh layer and a sealing layer for a nonwoven cementitious composite.
Figure 7:
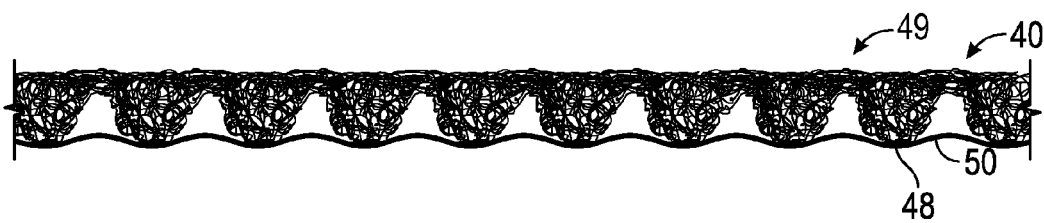
FIGS. 7-8 are cross-sectional views of a mesh layer and a sealing layer for a nonwoven cementitious composite.
Figure 8:
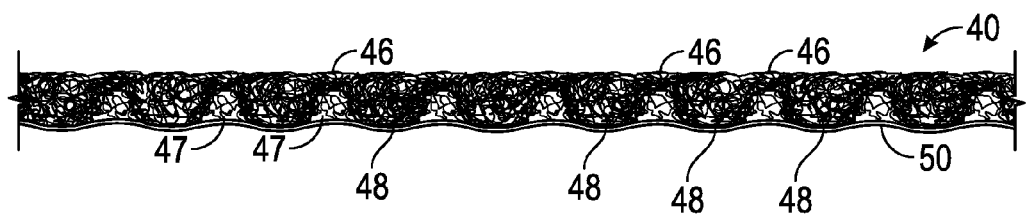

Referring to the exemplary embodiment shown in FIGS. 5-8, strands 42 of structure layer 40 are disposed randomly with many intertwined twists and turns. Despite the random pattern of the intertwined strands 42, a pattern is formed in the structure layer 40 and, according to an exemplary embodiment, the pattern is a three-dimensional pattern. As shown in FIG. 5, the pattern defines a plurality of projections, shown as projections 46, and a plurality of nodes, shown as nodes 48. Strands 42 of structure layer 40 may be arranged, formed, or otherwise disposed into the pattern. By way of example, a strand of material (e.g., a polymeric material) may be disposed into a mat, and a roller (e.g., a heated roller, etc.) may be used to produce projections 46. The mat passes through or beneath the heated roller, which simultaneously compresses and fuses or melts portions of the strands 42 to create alternating projections 46 and nodes 48, according to an exemplary embodiment. As shown in FIG. 8, projections 46 define a plurality of interstices, shown as interstices 47. By way of example, projections 46 may form pockets (e.g., semi-enclosed depressions within structure layer 40) that define interstices 47. In one embodiment, interstices 47 are ideally suited to contain at least a portion of the cementitious material of cementitious layer 30.

As shown in FIGS. 5-8, projections 46 are substantially dome-shaped and extend in a direction that is orthogonal to the general plane of structure layer 40. In other embodiments, projections 46 are otherwise shaped (e.g., ovular, semi-spherical, blades, ridges, etc.). In still other embodiments, projections extend in another direction (e.g., angularly offset from a direction that is orthogonal to the general plane of structure layer 40). According to the exemplary embodiment shown in FIGS. 5-8, projections 46 and nodes 48 are formed in a diagonal array. In other embodiments, projections 46 and nodes 48 are formed in another type of array (e.g., circular, square, etc.) or are arranged irregularly (e.g., randomly).

Referring again to the exemplary embodiment shown in the sectional views of FIGS. 7-8, impermeable layer 50 is coupled to structure layer 40 at nodes 48. In one embodiment, impermeable layer 50 is coupled to structure layer 40 at each of the nodes 48. Impermeable layer 50 may include a feature to facilitate bonding with structure layer 40 (e.g., scoring, a nonwoven material having a thickness of between one and ten millimeters of the same material as impermeable layer 50 and structure layer 40 disposed atop and coupled thereto, etc.). In another embodiment, impermeable layer 50 is coupled to structure layer 40 at a subset of nodes 48. According to an exemplary embodiment, strands 42 are manufactured from a polymeric material (e.g., polypropylene), and impermeable layer 50 is manufactured from a polymeric material (e.g., polypropylene). Strands 42 of structure layer 40 may be fused to impermeable layer 50 at nodes 48. As previously described, a heated roller may be used to fuse structure layer 40 to impermeable layer 50 at nodes 48 simultaneous with the creation of the fused nodes 48. Alternatively, the fusion of these two layers can be done independent of the creation of the nodes 48. In one embodiment, nodes 48 are defined at locations where structure layer 40 is fused to impermeable layer 50. Strands 42 may have a cross-sectional thickness that is configured to facilitate bonding between structure layer 40 and impermeable layer 50. According to an exemplary embodiment, strands 42 have a cross-sectional thickness of greater than twenty microns (e.g., 1,000 microns). The cross-sectional thickness of strands 42 may facilitate bonding by producing a volume of molten material sufficient to bond mesh layer 40 with impermeable layer 50. It is important to develop a balance between the bonded portions of the two layers and the unbonded portions of the two layers in order to develop the level of flexibility of mesh layer 40 desired for installation of the composite (e.g., to roll, to handle, etc.).

In one embodiment, upper portions of projections 46 (e.g., portions further from impermeable layer 50, portions further from nodes 48, portions raised further, etc.) define a plurality of apexes. The plurality of apexes may define an exposed portion of structure layer 40 to which permeable layer 20 may be bonded (i.e., permeable layer 20 may be bonded to the apexes, which protrude from cementitious layer 30). Four apexes are disposed adjacent (i.e., alongside, in immediate proximity to, etc.) nodes 48, according to an exemplary embodiment. In other embodiments, more or fewer apexes are disposed adjacent nodes 48. As shown in FIGS. 5-8, a plurality of walls 49 are formed between the apexes defined by projections 46. In one embodiment, walls 49 have a lower height (e.g., relative to impermeable layer 50, relative to nodes 48, etc.) than the apexes defined by projections 46. According to an exemplary embodiment, the apexes provide bonding surfaces that may be coupled to a containment layer. In one embodiment, nonwoven cementitious composite 10 includes a containment layer that is bonded to the apexes defined by projections 46 and spaced from the upper surfaces of walls 49 such that mobility (i.e., flexibility, the ability to manipulate or place, etc.) of the composite is maintained due to a balance between bonded portions and unbonded portions thereof.

According to an exemplary embodiment, structure layer 40 may have independent mechanical properties apart from those of the other layers of nonwoven cementitious composite 10. By way of example, such mechanical properties may include tensile strength, elongation at break, and tear strength, among other known properties. These mechanical properties may vary, for example, based on the thickness, length, or coupling between strands 42. According to an exemplary embodiment, structure layer 40 has a thickness of between five and 100 millimeters. Such a structure layer 40 may also have a weight of between 0.5 and 10 ounces per square foot.

The mechanical properties of structure layer 40 may also be impacted by the composition of strands 42, which may be manufactured from various known materials. According to an exemplary embodiment, strands 42 are polypropylene. According to an alternative embodiment, strands 42 are another material (e.g., silicon carbide, aluminum oxide, nylon, polypropylene, coconut fiber, cellulose fiber, other synthetic materials, other natural materials, etc.). The modulus of elasticity and geometry of structure layer 40 may affect the flexibility of nonwoven cementitious composite 10. Such a structure layer 40 having one of a lower modulus of elasticity or more open geometry may increase the pliability (e.g., lower radius of curvature) of nonwoven cementitious composite 10 (e.g., for shipping, to contain cementitious material, etc.).

According to an alternative embodiment, a coating may be disposed around at least a portion of the fibers. By way of example, the coating may be configured to improve various properties (e.g., strength, durability, etc.) of structure layer 40. As still a further example, the coating may improve the bond strength of the fibers within structure layer 40, of structure layer 40 to permeable layer 20 and impermeable layer 50, and of structure layer 40 to cementitious layer 30 after in-situ hydration. By way of example, the coating may include an abrasive coating (e.g., similar to a Scotch-Brite® heavy duty scouring pad), a coating to provide resistance to ultraviolet light, a coating to protect strands 42 from the cementitious materials (e.g., improved alkaline resistance), or still another known coating.

According to an alternative embodiment, nonwoven cementitious composite 10 includes a scrim lining (e.g., reinforcing material, geotextile, geogrid, another nonwoven material, a woven material, etc.) coupled (e.g., fused, integrally formed, joined, etc.) to structure layer 40. A scrim lining may be coupled to one or more surfaces of structure layer 40 or disposed within structure layer 40. A scrim lining made from a similar material as permeable layer 20 may improve bonding of permeable layer 20 to structure layer 40 (e.g., when the scrim is disposed along the bonding interface). The scrim lining may improve the tensile strength of structure layer 40 and nonwoven cementitious composite 10 both before and after in-situ hydration. By way of example, a loosely assembled structure layer 40 may have a tendency to separate, and a scrim lining may reinforce structure layer 40 to prevent such separation.

According to an alternative embodiment, the structure layer may include a plurality of nonwoven portions coupled together. The plurality of nonwoven portions may be different materials, have different densities, or have other distinct characteristics. According to an exemplary embodiment, a first nonwoven portion may interface with one or more additional nonwoven portions having different properties than the first nonwoven portion. In some embodiments, the first nonwoven portion is intertwined with another nonwoven portion. In other embodiments, the first nonwoven portion is stacked with another non-woven portion. According to an exemplary embodiment, the various portions may be coupled (e.g., fused, integrally formed, joined, etc.) with one another. A structure layer that includes different nonwoven portions may provide unique mechanical and structural properties in at least one of the lateral, the longitudinal, and the thickness direction of the nonwoven cementitious composite (i.e. a direction orthogonal to a surface of the composite) before and after in-situ hydration. By way of example, a first nonwoven portion having short strands configured to provide localized strength disposed within (i.e. intertwined) a second nonwoven portion having longer strands configured to provide durability and prevent separation of the structure layer. Together, the first and second nonwoven portions may provide both localized strength and durability for the nonwoven cementitious composite.

Cementitious Layer

Referring again to the exemplary embodiment shown in FIGS. 2-8, cementitious layer 30 comprises materials that set and harden once exposed to a fluid (e.g., water) through a hydration process. According to an exemplary embodiment, cementitious layer 30 is disposed within structure layer 40 and undergoes its normal setting and hardening process after in-situ hydration.

The setting process may begin once cementitious layer 30 interacts with a fluid (e.g., water). Such hydration and setting processes change cementitious layer 30 from a powder to a solid material. While setting produces a hardened material, curing may improve the strength of nonwoven cementitious composite 10. According to an exemplary embodiment, cementitious layer 30 has a compressive strength of between two and five thousand pounds per square inch. According to an alternative embodiment, cementitious layer 30 is modified with high performance cementitious ingredients and additives to achieve strength values in excess of five thousand pounds per square inch.

According to an exemplary embodiment, water is added to cementitious layer 30 to initiate the hydration processes. An operator may topically apply water to the surface of nonwoven cementitious composite 10 in-situ to set and harden cementitious layer 30. In some embodiments, in-situ hydration may occur where nonwoven cementitious composite 10 is horizontal, positioned at an angle, or positioned over a curved surface without undermining the strength of nonwoven cementitious composite 10. According to an exemplary embodiment, nonwoven cementitious composite 10 may be hydrated even if positioned at up to a 90 degree angle relative to level. It has been experimentally confirmed that a portion of nonwoven cementitious composite 10 positioned at a steeper angle (e.g., at a steeper flat angle, a steeper portion of a curved surface, etc.) may require a greater quantity of water to hydrate. Such additional water may be advantageous because a portion of the applied water flows over, without being absorbed by, nonwoven cementitious composite 10. In these or other embodiments, cementitious layer 30 may set without segregating and bleeding.

The characteristics of the hydrated nonwoven cementitious composite 10 may be affected by the particle size of the constituent elements of cementitious layer 30. By way of example, particle size and density may affect the homogeneity of cementitious layer 30 thereby impacting various properties (e.g., strength, flexibility, etc.) of nonwoven cementitious composite 10. According to an exemplary embodiment, the constituent particles of cementitious layer 30 have an approximately equal particle size (e.g., within 150 microns). According to an alternative embodiment, the constituent particles of cementitious layer 30 may have different sizes (i.e. a variation of more than 150 microns) that vary between 0.5 and 450 microns. A cementitious layer 30 having differentially sized particles may improve packing and minimize open space within cementitious layer 30.

According to an exemplary embodiment, cementitious layer 30 comprises a single material (e.g., Portland cement, etc.). According to an alternative embodiment, cementitious layer 30 includes a mixture of materials such as cement, supplementary cementitious materials (e.g., fly ash, silica fume, slag, metakaolin, etc.), aggregates (e.g., fine aggregates, course aggregates, sand, etc.), and additives (e.g., fibers, plasticizers, accelerators, retarders, super absorbent polymers, etc.). According to an exemplary embodiment, cementitious layer 30 comprises approximately twenty-five percent Portland cement, twenty-five percent high alumina cement (e.g., Quix), forty-eight percent fine aggregates, and two percent non-chloride accelerator. As discussed below, this mix ratio has been experimentally confirmed to be particularly suited for use within nonwoven cementitious composite 10.

According to another exemplary embodiment, cementitious layer 30 includes an additive. Such an additive may be used to improve the mechanical properties (e.g., strength, setting time, curing requirements, thermal coefficient of expansion, etc.) or durability, among other characteristics, of the cement or may be used as a substitute for a portion of the cementitious materials. According to an exemplary embodiment, the additive includes a pozzolonic material (e.g., fly ash, bottom ash, silica fume, slag, metakaolin, etc.) added at a specified mix ratio.

According to an exemplary embodiment, cementitious layer 30 is cured using an external curing process. By way of example, such external curing may include water ponding. According to various alternative embodiments, the external curing process includes water spraying, wet burlap, sheeting, curing compounds, absorbent sands, and accelerated curing, among other known methods. According to an alternative embodiment, permeable layer 20 formed of a hydrophilic material (e.g., paper, cellulose based materials, etc.) may improve curing by holding water to prolong exposure of cementitious layer 30 to a fluid. According to an alternative embodiment, permeable layer 20 formed of a coating material having fewer apertures may improve curing by reducing the evaporation of water from cementitious layer 30.

According to still another alternative embodiment, cementitious layer 30 is cured using an internal curing process. According to an exemplary embodiment, cementitious layer 30 is cured using internal water curing where cementitious layer 30 includes a component that serves as a curing agent to the cementitious mixture. Such a component may include either an aggregate or a new component (e.g. an additive, super absorbent polymer, special aggregate, etc.) introduced into cementitious layer 30 during the manufacturing process. Further, hydrophilic additives (e.g., super absorbent polymers, etc.) may improve curing by facilitating the ingress of water within cementitious layer 30. According to an exemplary embodiment, structure layer 40 may hold (e.g., secure, trap, etc.) water within the open space to improve curing of cementitious layer 30. According to an alternative embodiment, structure layer 40 is hydrophilic (e.g., absorbent, etc.) and facilitates the absorption of water into cementitious layer 30.

Permeable Layer

Referring again to the exemplary embodiment shown in FIGS. 2-4C, permeable layer 20 facilitates the dispersion of a fluid (e.g., water, etc.) into nonwoven cementitious composite 10 while retaining cementitious layer 30. Permeable layer 20 may include specified characteristics that manage the flow of the fluid through permeable layer 20. According to an exemplary embodiment, the specified characteristics allow for the hydration of cementitious layer 30 without allowing the cementitious material to migrate from structure layer 40 (e.g., during handling before in-situ hydration, during in-situ hydration, etc.). In other embodiments, the specified characteristics may also maintain the mix ratio of cementitious layer 30 during the hydration and hardening processes. Further, permeable layer 20 may maintain the level of compaction of cementitious layer 30 by applying consistent pressure to the cementitious material. According to an exemplary embodiment, less than 10 percent by weight of cementitious layer 30 migrates through permeable layer 20 prior to in-situ hydration. In some embodiments, up to 10 percent by weight of cementitious layer 30 may migrate through permeable layer 20 without compromising the structural performance of nonwoven cementitious composite 10 after in-situ hydration.

According to an exemplary embodiment, permeable layer 20 comprises a woven or nonwoven polyolefin of the same family as structure layer 40 (e.g., polypropylene). Manufacturing both layers from similar materials facilitates the coupling of permeable layer 20 to structure layer 40 (e.g., by melting, ultrasonic welding, adhesive, etc.) and improves bond strength. According to an alternative embodiment, permeable layer 20 and structure layer 40 comprise different materials but may still be coupled together (e.g., with an adhesive, etc.). By way of example, permeable layer 20 may comprise a sand blasting fabric having a resistance to ultraviolet light (e.g., white FR/UV sandblasting fabric 27600 as manufactured by TenCate, NW6 polypropylene fabric manufactured by Colbond, etc.). According to an exemplary embodiment, permeable layer 20 has a weight of approximately six ounces per square yard. According to an alternative embodiment, permeable layer 20 comprises Grade 354 Airtex as manufactured by Georgia-Pacific, which has a weight of between 0.16 and 0.32 ounces per square foot.

According to an exemplary embodiment, permeable layer 20 includes a plurality of apertures, among other features, having a specified shape, area, frequency, or spacing. By way of example, the apertures may have a specified shape (e.g., circular, ovular, rectangular, etc.), depending on the particular application of nonwoven cementitious composite 10. According to an exemplary embodiment, the size of the apertures may also be specified. By way of example, oversized apertures may allow sieving of cementitious layer 30 prior to in-situ hydration. In contrast, undersized apertures may provide too slow or incomplete hydration of cementitious layer 30. According to an exemplary embodiment, the apertures are designed to prevent particles less than fifteen microns from migrating from nonwoven cementitious composite 10 and have an area of between 0.001 and 3 square millimeters.

According to an exemplary embodiment, the frequency of the apertures may be specified to facilitate the transfer of water into cementitious layer 30. According to an exemplary embodiment, permeable layer 20 includes between one and twelve thousand apertures per square inch. According to an alternative embodiment, permeable layer 20 is a permeable material that does not include apertures (e.g., a fibrous material, paper, etc.).

According to an exemplary embodiment, permeable layer 20 is coupled to structure layer 40 during the manufacturing process. Such a permeable layer 20 may be designed as a removable product that does not remain coupled with structure layer 40 throughout the life of nonwoven cementitious composite 10. According to an exemplary embodiment, permeable layer 20 comprises a containment sheet (e.g., biodegradable paper, water soluble plastic, etc.) that secures cementitious layer 30 during the transportation of nonwoven cementitious composite 10. In some embodiments, the containment sheet may be removed before or after the nonwoven cementitious composite 10 is in place in the field. Such removal of the containment sheet may occur either before or after in-situ hydration. In either embodiment, permeable layer 20 may include flow channels (e.g., perforations) designed to facilitate the flow of water into cementitious layer 30. According to an alternative embodiment, permeable layer 20 is not removed and erodes in the field from weathering without compromising the structural performance of nonwoven cementitious composite 10. According to an alternative embodiment, permeable layer 20 is treated with a coating (e.g., for ultraviolet resistance, etc.) to extend service life in the field.

According to still another alternative embodiment, permeable layer 20 may comprise a coating (e.g., elastomeric coatings, acrylic coatings, butyl rubber coatings, Hypalon® coatings, Neoprene® coatings, silicone coatings, modified asphalt coatings, acrylic lacquer coatings, urethane coatings, polyurethane coatings, polyurea coatings, one of various coatings approved for potable water, any combination of two or more coating materials, etc.). Such a coating may be applied through various known techniques (e.g., spraying, etc.) in one of a single and plural component form such that the material dries (i.e. sets, cures, etc.) into one of a permeable and impermeable coating. According to an exemplary embodiment, permeable layer 20 is AquaVers 405 as manufactured by Versaflex and has a thickness of between 0.07 and 2.0 millimeters. According to an alternative embodiment, the coating is another material having a low modulus of elasticity and a percent elongation of between 5 and 1000 percent. According to an alternative embodiment, a primer may be applied to a side of structure layer 40 before permeable layer 20 is sprayed on to improve bond strength (e.g., epoxy primers, acrylic primers, etc.). According to an alternative embodiment, additional treatment coatings may be applied to permeable layer 20 (e.g., to change the texture, color, etc. of permeable layer 20). In some embodiments, the additional treatment coating may be applied after an initial coating is applied. In still other embodiments, the additional treatment coating is applied over the various other materials discussed above for permeable layer 20 (e.g., woven or nonwoven polyolefin, etc.).

According to an exemplary embodiment, coating materials used for permeable layer 20 include three dimensional voids. Such a three dimensional void may comprise a sidewall configured to secure cementitious layer 30 within nonwoven cementitious composite 10. According to an exemplary embodiment, the three dimensional void is cone shaped. Such a cone shaped three dimensional void includes a larger cross sectional area along an outer surface of permeable layer 20 to draw water inward and a smaller cross sectional area proximate to cementitious layer 30 to prevent the cementitious material from migrating out of nonwoven cementitious composite 10. According to an alternative embodiment, the three dimensional void may have another shape (e.g., tetrahedral, etc.). Apertures having various shapes (e.g., triangle, circle, oval, diamond, square, rectangle, octagon, etc.) may also be formed in the coating.

Where permeable layer 20 comprises a coating, three dimensional voids or apertures (e.g., tetrahedral shaped, diamond shaped, etc.) may partially close when nonwoven cementitious composite 10 is rolled. Partially closing the apertures may better secure the cementitious material (e.g., during transportation, etc.). Certain shapes (e.g., tetrahedral, diamond, etc.) may close more securely than other shapes. As the radius of curvature increases from rolling, tension on permeable layer 20 increases and deforms the coating in the direction of the curve. Such deformation decreases the size (e.g., diameter, etc.) of the three dimensional voids or apertures in direction opposite of the curve. According to an exemplary embodiment, three dimensional void or aperture returns to its original shape and size when unrolled.

According to an alternative embodiment, forming three dimensional voids or apertures with a material removal tool (e.g., laser, electron beam, a blade, etc.) fully removes the coating material in the three dimensional void or aperture. Such a process may prevent the three dimensional voids or apertures from closing or refilling. Apertures otherwise formed (e.g., with a point, etc.) may become refilled and require subsequent processing.

According to an alternative embodiment, permeable layer 20 is manufactured from a coating material that dries water-permeable such that apertures are not necessary to facilitate the transfer of hydration water. However, perforations may be added to permeable layer 20 comprising a water-permeable material to further promote the hydration of cementitious layer 30. According to an alternative embodiment, a side of structure layer 40 is not entirely covered by the coating but nonetheless contains the cementitious material and allows for hydration (e.g., without the need for separate three dimensional voids or apertures).

According to an exemplary embodiment, permeable layer 20 is sprayed onto a side of structure layer 40 and apertures are thereafter defined within permeable layer 20 (e.g., with a roller having points, a plate having points, etc.). Whether provided as a sheet, a product applied through spraying, or another product, permeable layer 20 may also include a texture (e.g., by including an abrasive within the coating, etc.) or coefficient of friction designed to allow for improved traction for objects (e.g., vehicles, people, etc.) moving across permeable layer 20. According to an alternative embodiment, permeable layer 20 may have a smooth surface, a surface designed to facilitate the flow of water into nonwoven cementitious composite 10, or a decorative finish.

Impermeable Layer

Referring again to the exemplary embodiment shown in FIGS. 2-8, impermeable layer 50 comprises a material capable of retaining cementitious layer 30 and hydration water without degrading after interacting with the cementitious material. As shown in FIGS. 2-8, impermeable layer 50 is coupled along a side (e.g., a lower side) of structure layer 40. Where impermeable layer 50 is positioned along a lower side of structure layer 40, impermeable layer 50 may experience a portion of the flexural and tensile stresses. Such a position may improve the strength and ductility of nonwoven cementitious composite 10. In some embodiments, impermeable layer 50 is a sheet that comprises a flexible material (e.g., to facilitate rolling nonwoven cementitious composite 10) that is capable of being coupled with structure layer 40 without allowing a fluid to seep through. According to an alternative embodiment, impermeable layer 50 may be integrally formed with or otherwise coupled to structure layer 40. According to an alternative embodiment, impermeable layer 50 may protect cementitious layer 30 from exposure to certain chemicals (e.g., from sulfate introduced by soils in the field, etc.).

According to an alternative embodiment, impermeable layer 50 comprises a geomembrane. Such a geomembrane may comprise various materials (e.g., synthetic sheeting, single-ply membrane, another type of membrane used for waterproofing, etc.). According to an exemplary embodiment, the geomembrane comprises a polyolefin film having a thickness of between 0.075 and 2.5 millimeters. According to an exemplary embodiment, impermeable layer 50 comprises extruded polypropylene or a reinforced polypropylene that provides improved puncture resistance and tensile strength relative to other materials. Reinforced materials (e.g., externally reinforced with nonwoven polyester fabric, internally reinforced with polyester scrim, reinforced with a woven fabric, reinforced with a non-woven fabric, a geogrid, or otherwise reinforced) allow for the use of a thinner membrane thereby reducing the overall weight or thickness of nonwoven cementitious composite 10. Specific exemplary polypropylene films include TT422 and TG 4000 as manufactured by Colbond or UltraPly TPO XR 100 as manufactured by Fireston. In other embodiments, the film includes a coated membrane, such as Transguard 4000 as manufactured by Reef Industries.

According to an alternative embodiment, impermeable layer 50 may comprise another material (e.g., bituminous geomembrane, ethylene propylene diene monomer, low-density polyethylene, high-density polyethylene, polyvinyl chloride, polyurea and polypropylene, etc.). The material selected for impermeable layer 50 may have characteristics that improve the pliability, installation procedures, lifespan, and performance of nonwoven cementitious composite 10. By way of example, polyvinyl chloride is flexible and may conform to uneven surfaces without tearing. According to an exemplary embodiment, a specific manufacturing technique, tensile strength, and ductility may be selected for impermeable layer 50 to best suit a particular application of nonwoven cementitious composite 10.

According to still another alternative embodiment, impermeable layer 50 may comprise a coating (e.g., elastomeric coatings, acrylic coatings, butyl rubber coatings, Hypalon® coatings, Neoprene® coatings, silicone coatings, modified asphalt coatings, acrylic lacquer coatings, urethane coatings, polyurethane coatings, polyurea coatings, one of various coatings approved for potable water, any combination of two or more coating materials, etc.) that may be applied through various known techniques (e.g., spraying, etc.). It should be understood that the thickness, material selections, and other discussion regarding permeable layer 20 are applicable to impermeable layer 50. In one embodiment, impermeable layer 50 has a thickness of between four and one hundred millimeters, for example, ten millimeters. According to an exemplary embodiment, permeable layer 20, impermeable layer 50, and the side portions of nonwoven cementitious composite 10 comprise the same coating material. According to an alternative embodiment, permeable layer 20 and impermeable layer 50 comprise different materials. In either embodiment, permeable layer 20 and impermeable layer 50 may be applied simultaneously or successively.

According to still another alternative embodiment, nonwoven cementitious composite 10 does not include an impermeable layer 50 and instead includes an additional permeable layer. Such a permeable layer may allow nonwoven cementitious composite 10 to fuse with substrates (e.g., existing concrete structures, etc.). By way of example, a permeable material may allow cementitious layer 30 to partially diffuse post-in-situ hydration and bond with a substrate below. External curing processes, internal curing processes (e.g., curing performed with compounds such as liquid polymer additives, etc.), or various additives in cementitious layer 30, may further improve the bond between nonwoven cementitious composite 10 and a substrate.

Manufacture and Installation

Figure 9A:
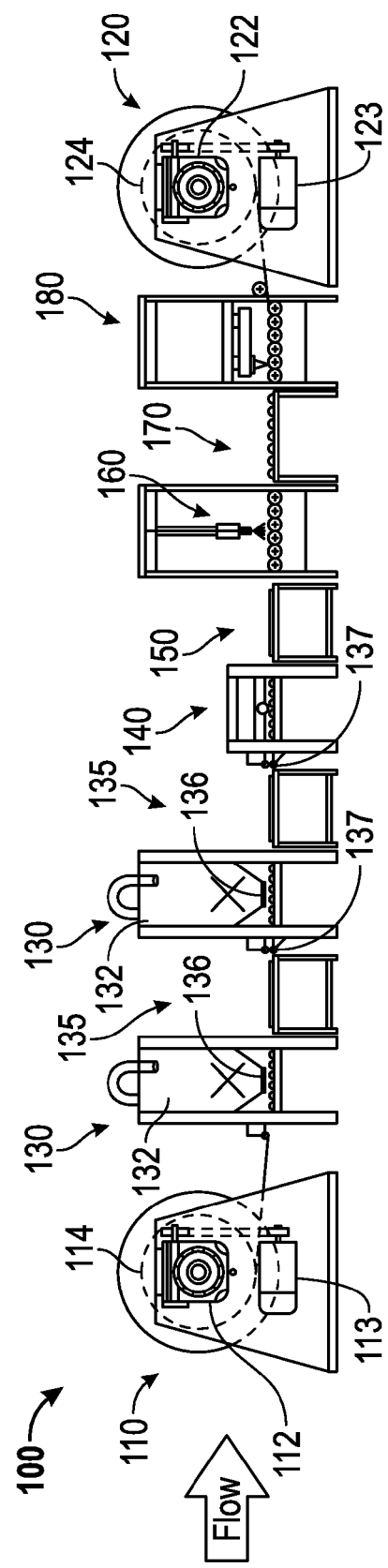
FIGS. 9A-9B are plan views of machines and methods for manufacturing a nonwoven cementitious composite.
Figure 9B:
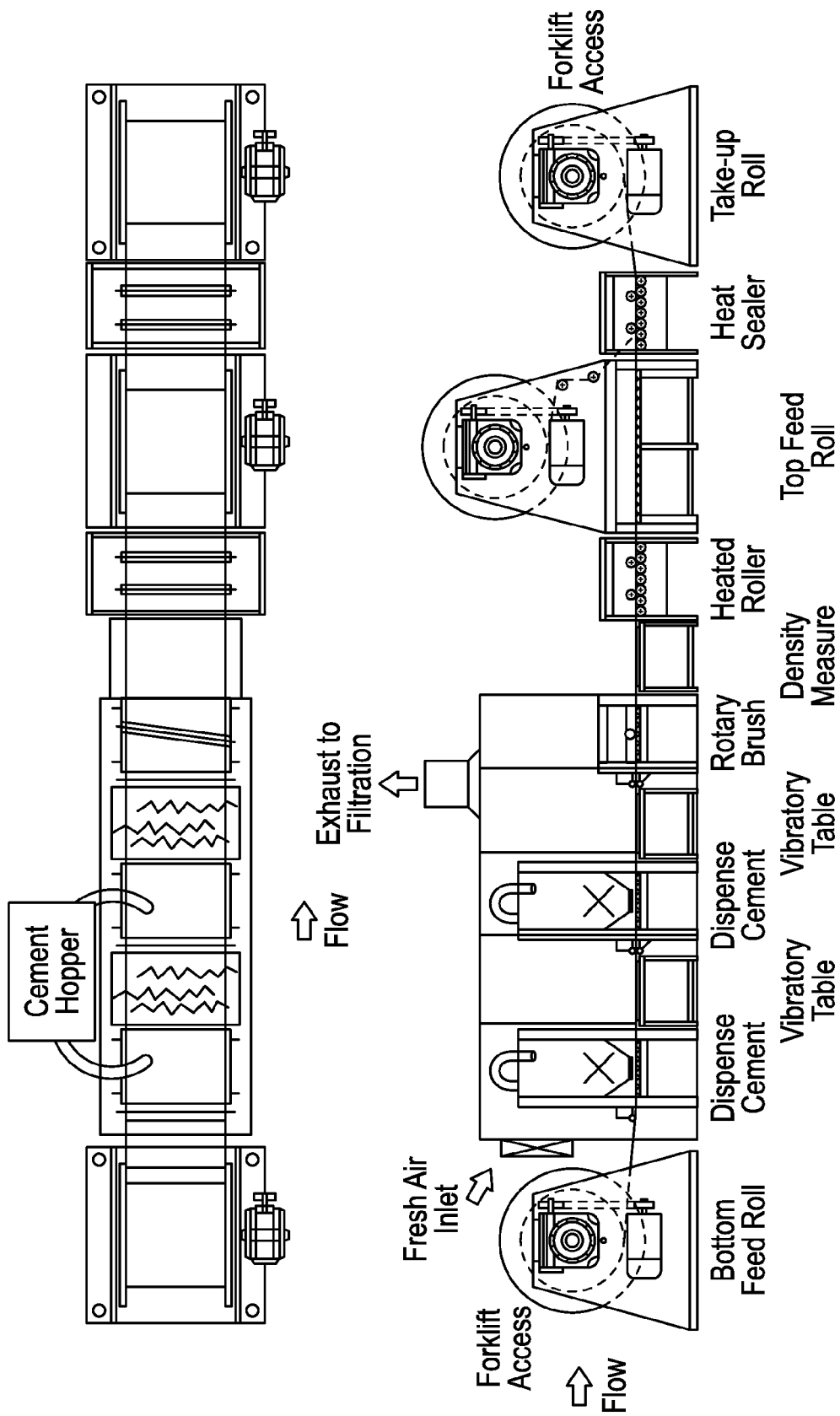

Referring next to FIGS. 9A-9B, the nonwoven cementitious composite is manufactured using a line assembly machine, which may operate continuously (i.e. provide material through at a constant rate for a period of time) or may engage in an indexed operation mode where material is fed, stopped (e.g., to allow the machine to perform an operation) and thereafter again feed. As shown in FIG. 9A, machine 100 includes an initial roll of material, shown as feeder 110. According to an exemplary embodiment, feeder 110 comprises a rotation system having a rotation device, shown as gear reducer 112 and motor 113 a core coupled to the motor, and a length of initial material, shown as material 114, wrapped around the core. It should be recognized that the rotation of the core by gear reducer 112 and motor 113 allows material 114 to feed off of the roll.

According to an exemplary embodiment, material 114 comprises a composite having an impermeable layer disposed along a bottom surface of a structural layer. By way of example, a manufacturer may receive material 114 having an impermeable and a structural layer from another supplier or may pre-assemble these layers, among other alternatives. According to an alternative embodiment, material 114 does not include a structural layer (e.g., includes only an impermeable layer, etc.). An assembly machine receiving such a material 114 may include additional components configured to thereafter (e.g., as a separate step, etc.) position a structural layer along a first side of the impermeable layer. According to still another alternative embodiment, material 114 does not include an impermeable layer (e.g., includes only a structural layer, etc.). An assembly machine receiving such a material 114 may include additional components configured to thereafter position an impermeable layer along a first side of the structural layer.

Referring again to the exemplary embodiment shown in FIG. 9A, machine 100 feeds material 114 through a dispenser, shown as cementitious dispenser 130. As shown in FIG. 9A, cementitious dispenser 130 includes a hopper, shown as container 132 and a dispensing end, shown as distributor 136 configured to deposit cementitious material onto material 114 as it passes below cementitious dispenser 130. In some embodiments, distributor 136 may be shaped (e.g., rectangular, adjustable, etc.) to facilitate even distribution of cementitious material onto material 114.

As shown in FIG. 9A, material 114 having received cementitious material from cementitious dispenser 130 thereafter passes over a compactor, shown as vibratory table 135. According to an exemplary embodiment, vibrations from vibratory table 135 compact (i.e. fills, disposes, impregnates, etc.) cementitious material within the structural layer of material 114 to form a uniform cementitious layer. According to the exemplary embodiment shown in FIG. 9A, machine 100 includes a physical compactor, shown as rollers 137. In some embodiments, rollers 137 are configured to compress material 114 with a pressure of between 200 and 10,000 pounds per square inch. Such rollers 137 may replace vibratory table 135 or may be positioned before, after, or with vibratory table 135 within machine 100. Rollers 137 may also move material 114 through machine 100. According to an alternative embodiment, machine 100 includes a hydraulic press or other type of physical compactor. According to an alternative embodiment, machine 100 incorporates a vacuum system configured to draw cementitious material into the structure layer (e.g., where the composite material does not include an impermeable layer). As shown in FIG. 9A, machine 100 includes a second cementitious dispenser 130 and vibratory table 135 to dispense and compact additional cementitious material within the structural layer of material 114.

In some embodiments, machine 100 further includes a rotary brush 140 configured to expose or clean at least a portion (e.g., 0.5 millimeters, 1 millimeter, 2 millimeters, etc.) of the strands within material 114 (i.e. a top portion of the structure layer). By way of example, rotary brush 140 may be used to remove debris (e.g., cementitious material) in line from an exposed portion of a structural layer (e.g., lengths of strands protruding from the cementitious material). According to an exemplary embodiment, removing a portion of the compacted cementitious material or cleaning the nonwoven strands more fully allows additional layers, such as a permeable layer, to bond to the structural layer. According to an alternative embodiment, exposure or cleaning of the nonwoven strands may be accomplished using another device (e.g., an air nozzle, a vacuum system, etc.). According to still another alternative embodiment, machine 100 does not include rotary brush 140 (e.g., cementitious dispenser 130 and vibratory table 135 may not entirely fill the structural layer with cementitious material, cleaning the nonwoven strands may not be required, etc.).

Referring again to the exemplary embodiment shown in FIG. 9A, a quality measurement may be taken with a measurement device, shown as density measurement system 150. By way of example, density measurement system 150 may include a scale configured to weigh the material 114 or ultrasound device to measure density of material 114 to ensure cementitious dispenser 130 provided a preferred amount of cementitious material. According to an alternative embodiment, quality may be otherwise ensured, and machine 100 may not include density measurement system 150. Another alternative embodiment utilizes a measurement device configured to determine the length of fibers extending from the structure layer to confirm the proper level of cementitious material is dispensed. If the density measurement is out of specification, machine 100 may enter a trouble mode (e.g., by stopping processing material 114, by sounding an alarm, etc.). An operator may manually add cementitious material to material 114, clear the machine from the trouble mode, and re-start machine 100. According to an alternative embodiment, machine 100 may automatically add an appropriate amount of cementitious material to bring the density into specification.

As shown in FIG. 9A, machine 100 may deposit a coating onto material 114 with an applicator, shown as sprayer 160 to form an upper containment layer. As discussed above, such a coating may include elastomeric coatings, acrylic coatings, butyl rubber coatings, Hypalon® coatings, Neoprene® coatings, silicone coatings, modified asphalt coatings, acrylic lacquer coatings, urethane coatings, polyurethane coatings, polyurea coatings, one of various coatings approved for potable water, any combination of two or more coating materials, or still other coatings. In some embodiments, the coating is configured to secure the cementitious material provided by cementitious dispenser 130 within material 114. A single sprayer may be configured on a track to move across material 114 or one or more spray units may be stationary and configured to apply a coating to at least one of the top, sides, and ends of material 114. According to an exemplary embodiment, the coating is applied in a one of a single and plural component and allowed to cure (i.e. dry, set, etc.) as it travels along a curing section 170.

According to an alternative embodiment, a film, sheet, or other configuration of material may be applied by machine 100 to form an upper containment layer. By way of example, the upper containment layer may include a water soluble material (e.g., a cold water soluble material). In some embodiments, the water soluble material is a fabric material. Such a fabric material may be woven or nonwoven. In one embodiment, the fabric material is a cold water soluble nonwoven material manufactured from partially hydrolyzed polyvinyl alcohol fibers (e.g. a PVA fabric). Such a film or sheet may be melted, welded, adhesively secured, or otherwise bonded to the structural layer of material 114 (e.g., the structural layer of material 114 may be melted and bond with the water soluble material). As shown in FIG. 9B, the upper containment layer may be applied as part of a continuous process, where the structural layer and the upper containment layer are moved at a common speed. According to an exemplary embodiment, the upper containment layer is bonded to the structural layer of material 114 with the application of heat (e.g., with a heated roller, with a heated air stream, with a hot plate, with a furnace, etc.) as part of the continuous process. Pressure may be applied to the upper containment layer (e.g., with a roller) as part of the heating processes or after heating (e.g., with a cooling roller) to produce a tight composite material. In one embodiment, the upper containment layer is applied along only a top surface of material 114. In another embodiment, a containment layer (e.g., a PVA fabric) is also applied to the sides of material 114. Bonding may be uniform across the top and sides of material 114.

According to an exemplary embodiment, melting involves increasing the temperature of the upper containment layer, side containment layers, or the top portion of the structure layer to just below a melting point and thereafter applying the upper and side containment layers to material 114. According to an alternative embodiment, ultrasonic welding involves compressing the upper containment layer against the structure layer and thereafter passing material 114 under an ultrasonic welder having arms configured to fold down the containment layer and seal the sides and ends of material 114. According to still another alternative embodiment, the upper or side containment layer may be adhesively secured to the structure layer.

According to the exemplary embodiment shown in FIG. 9B, apertures and indentations are defined within the upper containment layer with a perforator, shown as perforator 180. As discussed above, such three dimensional voids or apertures may be configured to facilitate the hydration process while containing the cementitious material within the nonwoven cementitious composite (e.g., during transportation, handling in the field, etc.). According to an exemplary embodiment, perforator 180 includes a laser (e.g., a continuous, a pulsed, etc.) or an electron beam, such as those discussed above, configured to produce the three dimensional voids or apertures. Such a perforator 180 may create the three dimensional voids or apertures without contacting or damaging the impermeable layer, structural layer, or the upper layer of material 114. Perforator 180 may have one or more lasers, depending on width and surface speed of material 114.

According to an alternative embodiment, perforator 180 includes sharpened points to puncture the upper containment layer when pressure is applied. Such points may be arranged to create a preferred size, shape, and frequency of perforations. In some embodiments, the length of the points may be specified to prevent damaging at least one of the structural layer and the impermeable layer. As shown in FIG. 9A, perforator 180 may include a press configured to move vertically and physically interact with upper containment layer to create a plurality of perforations.

Figure 10:
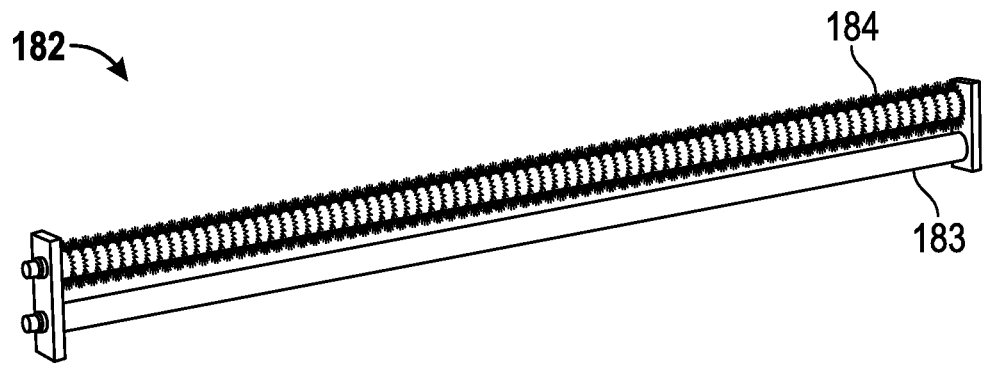
FIGS. 10-11 are perspective views of roller systems that may define apertures within a surface of a nonwoven cementitious composite.

According to the alternative embodiment shown in FIG. 10, the plurality of apertures and indentations may be formed using a rotational perforator, shown as roller 182. As shown in FIG. 10, roller 182 includes a bottom roller, shown as lower roller 183 configured to apply pressure to the bottom of material 114 and an upper roller, shown as pointed roller 184. In some embodiments, material 114 is drawn between lower roller 183 and pointed roller 184 during the initial manufacturing process.

Figure 11:
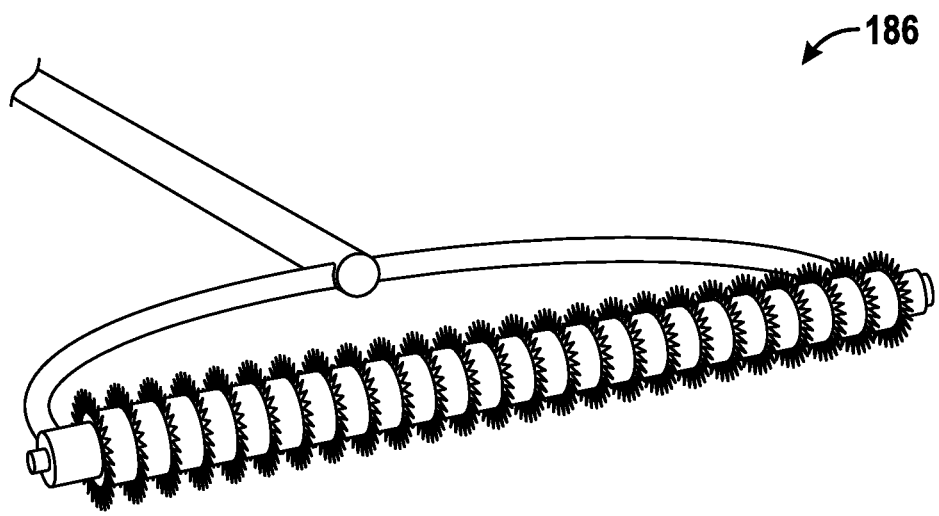

According to an alternative embodiment, an operator may create the perforations after the initial manufacturing process using a roller, such as roller 182 shown in FIG. 10. The roller utilized by the operator may be operated manually or may include a drive system configured to facilitate the operation of roller 182. In some embodiments, roller 182 is coupled to the equipment used to unroll nonwoven cementitious composite 10 in the field such that material 114 is drawn between lower roller 183 and pointed roller 184 to form apertures in the field. As shown in FIG. 11, the plurality of perforations may be alternatively applied by an operator using a roller, shown as roller 186. Such a roller 186 may be utilized by an operator either before or after positioning the nonwoven cementitious composite.

According to an exemplary embodiment, machine 100 includes a sealing system configured to seal the sides and ends of material 114. Such a sealing system may include additional sprayers configured to apply a coating to the sides and ends of material 114, a roller configured to fold a portion of the impermeable membrane over the sides and ends, or another system. According to an exemplary embodiment, sealing the sides and ends of material 114 further contains the cementitious material within material 114 and prevents it from migrating from the structure layer (e.g., during handling, transportation, installation, etc.).

Referring again to the exemplary embodiment shown in FIG. 9A, machine 100 includes a take-up roll, shown as processed roller 120. As shown in FIG. 9A, processed roller 120 includes a quantity of processed material, shown as material 124 disposed around a core. According to an exemplary embodiment, the core is coupled to a driver, shown as gear reducer 122 and motor 123. In some embodiments, gear reducer 122 and motor 123 may rotate and apply a driving force that draws material 114 through machine 100. According to an exemplary embodiment, material 124 is vacuum sealed either as an entire roll positioned on processed roller 120 or after it travels through curing section 170. According to an alternative embodiment, sheets of material 114 may be vacuum sealed individually or as a stacked group. Such sealing facilitates transportation and handling of the nonwoven cementitious composite.

Referring next to the exemplary embodiment shown in FIGS. 12A-15E, two sheets or rolls of nonwoven cementitious composite 10 may be joined together either during the initial manufacturing process (i.e. before an operator receives the product) or by an operator either before or after installation. Each sheet may have a width of between one and fifteen feet and may be configured in a square, rectangle, or other shape having an area between one and two hundred square feet. Each roll may have a width of between one and twenty feet and a length of ten to one thousand feet.

Various lapping configurations may be utilized to join adjacent sheets or rolls of nonwoven cementitious composite 10 to produce a continuous and waterproof surface or water-resistant surface. As shown in FIGS. 12A-12D, the sheets or rolls have an impermeable layer 50 that extends laterally outward past an edge of permeable layer 20 thereby creating a flange having an upper surface configured to receive a bottom surface of an adjacent nonwoven cementitious composite 10. According to the alternative embodiment shown in FIGS. 13A-13C, adjacent nonwoven cementitious composites 10 both include impermeable layers 50 that extend laterally outward past edges of permeable layers 20 thereby creating a pair flanges. According to an exemplary embodiment, the flanges have a length of between 0.5 inches and 8.0 inches.

According to still another alternative embodiment shown in FIGS. 14A-15E, adjacent nonwoven cementitious composites 10 include impermeable layers 50 that do not extend laterally outward past an edge of permeable layers 20. Such composites may be joined with an adhesive applied (e.g., as lines, in a pattern, etc.) to a surface of nonwoven cementitious composite 10, or a backing strip (e.g., a separate piece of impermeable membrane, etc.). According to an alternative embodiment the adhesive may be applied in the form of a sheet secured to a portion of one nonwoven cementitious composite 10 or to a backing strip. It should be understood that various contacting surfaces of nonwoven cementitious composite 10 may be etched, sanded, or otherwise abraded to improve the bond strength of the adhesive joint.

Figure 12A:
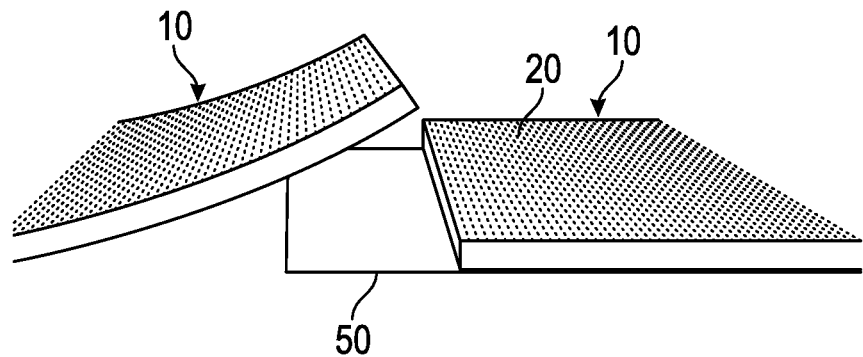
FIGS. 12A-15E are side elevation views of various joining methods used to couple adjacent sections of nonwoven cementitious composites.
Figure 12B:
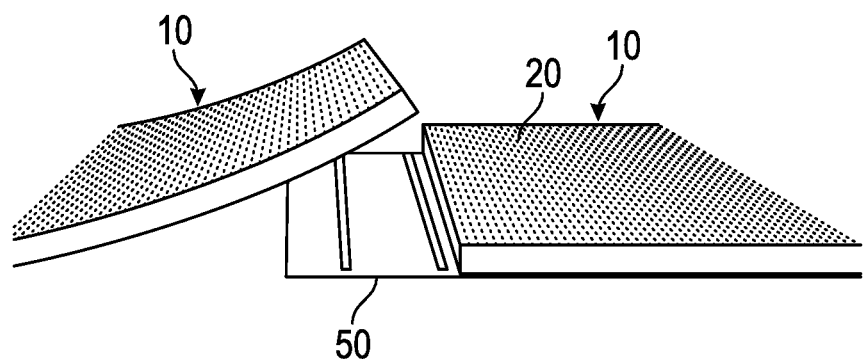
Figure 12C:
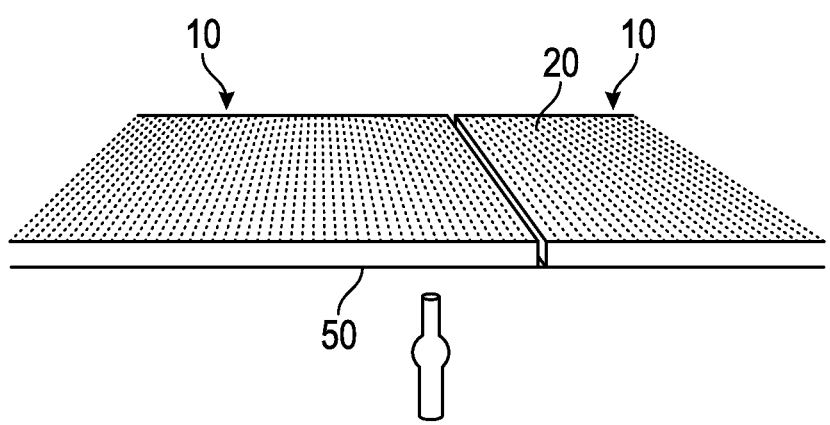
Figure 12D:
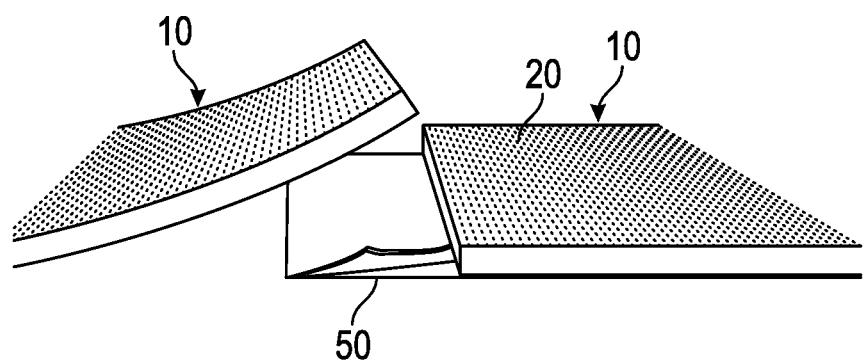
Figure 13A:
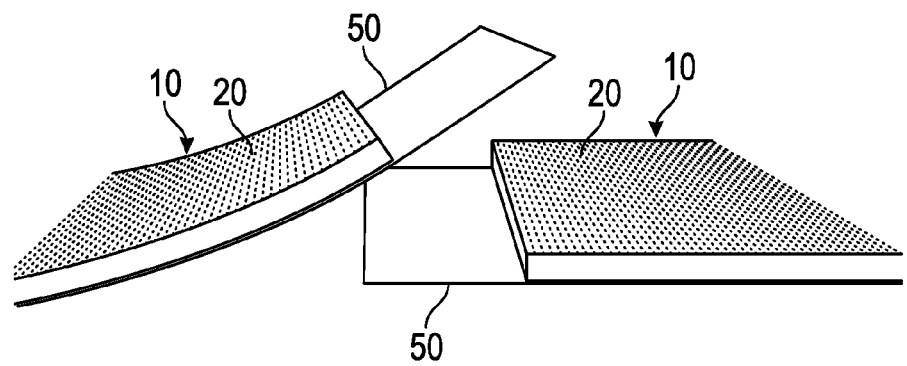
Figure 13B:
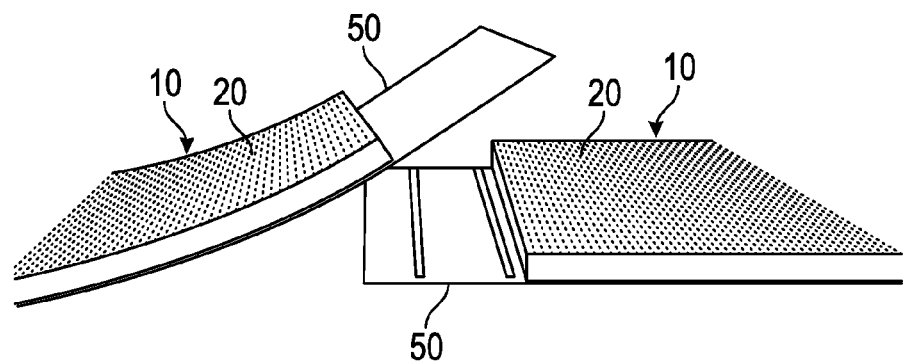
Figure 13C:
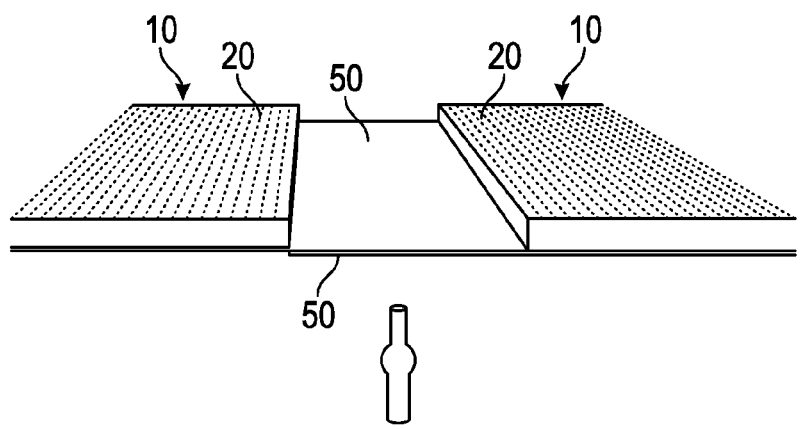
Figure 14A:
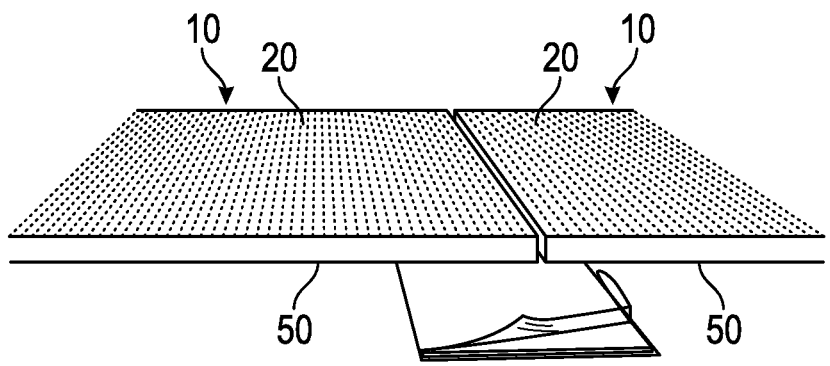
Figure 14B:
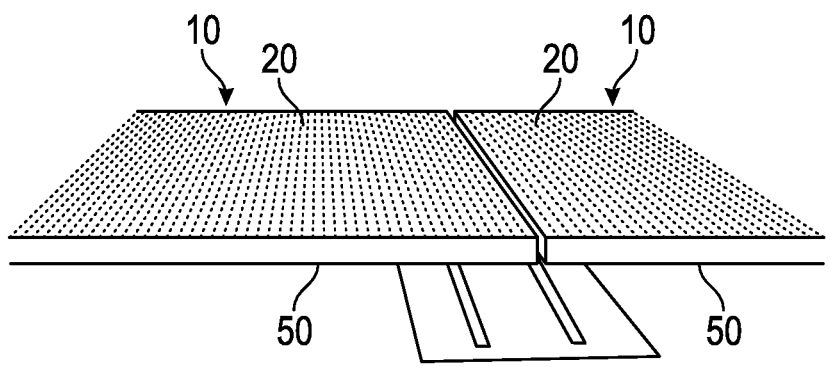
Figure 14C:
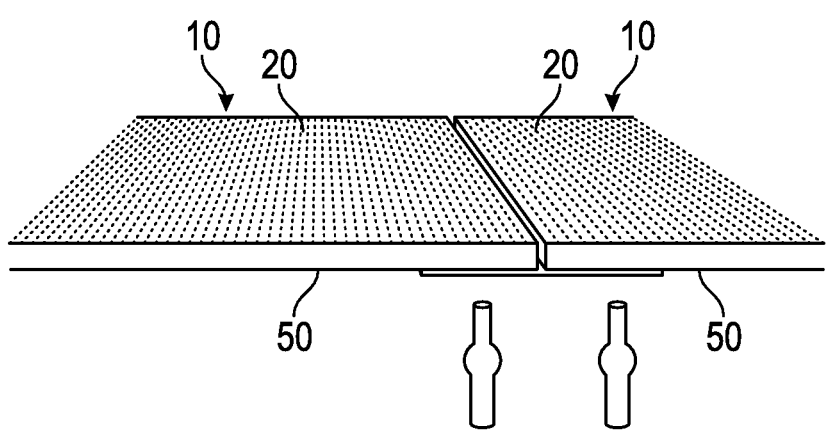
Figure 14D:
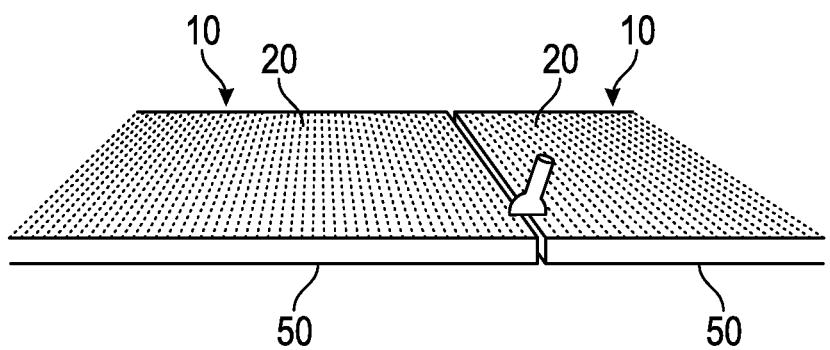
Figure 15A:
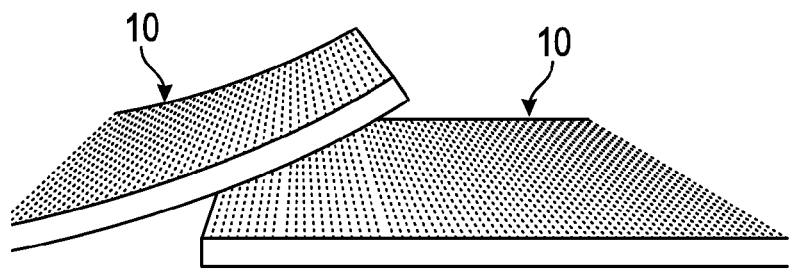
Figure 15B:
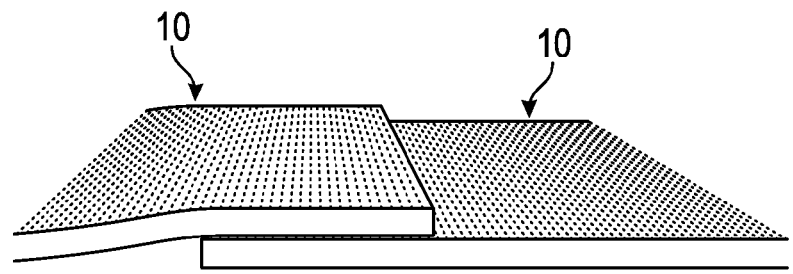
Figure 15C:
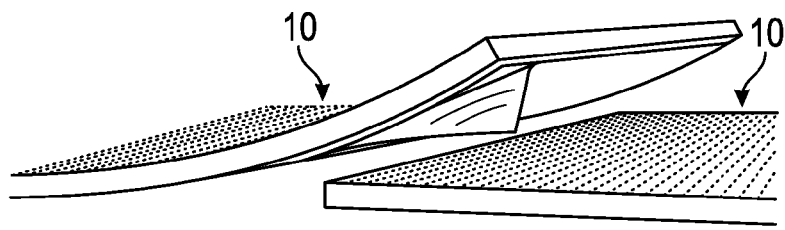
Figure 15D:
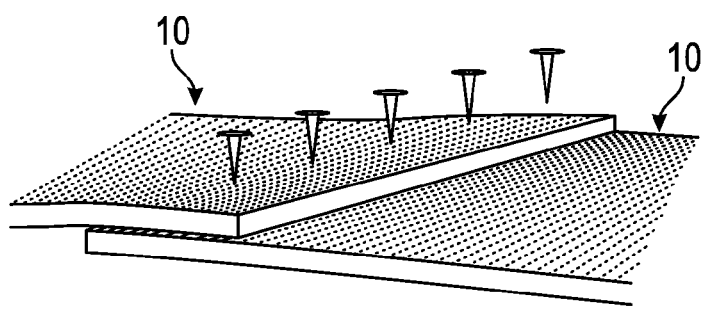
Figure 15E:
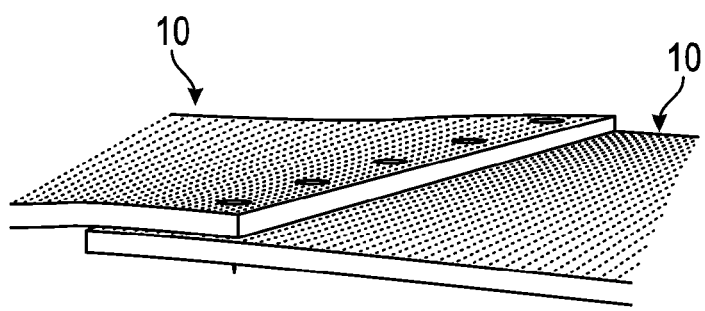

According to still another alternative embodiment shown in FIGS. 12C, 13C, and 14C, adjacent nonwoven cementitious composites 10 may be welded together (e.g., with hot air, ultrasonic, etc.) either with a backing strip or with flanges. In embodiments where welding is used, the flanges preferably have an equal length longer than the width of the welder horn (shown representationally in FIGS. 12C, 13C, and 14C). Welding in the field may be accomplished by an operator using a portable welder (e.g., hot air, ultrasonic, etc.) that may have a guide to set the proper distance for welding without damaging the impermeable layer or other layers of the nonwoven cementitious composite. Such a portable welder may also include rollers to facilitate constant movement thereby improving the quality of the welded joint. According to yet another alternative embodiment, adjacent nonwoven cementitious composites 10 do not include flanges and are instead joined with mortar or an adhesive as shown in FIG. 14D or with stakes, as shown in FIGS. 15D-15E.

Figure 16A:
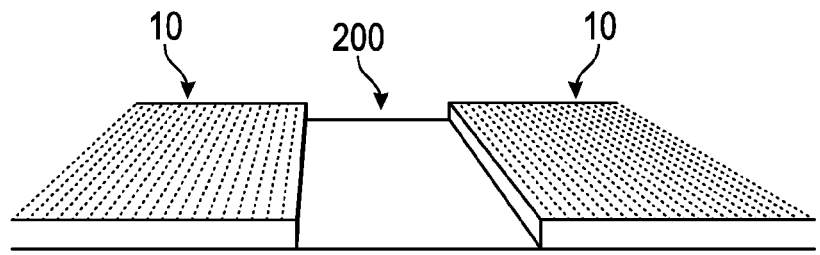
FIGS. 16A-16E are side elevation views of a method for filling a space between the structure layers of adjacent nonwoven cementitious composites.
Figure 16B:
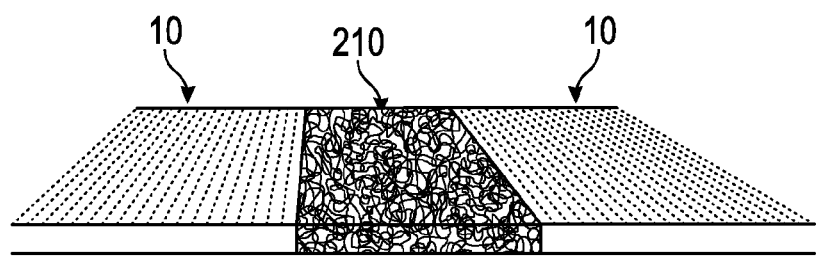

According to an exemplary embodiment shown in FIGS. 16A-16E, the joined nonwoven cementitious composites 10 may have a gap, shown in FIG. 16A as space 200 formed above the interfacing flanges. As shown in FIG. 16B, the joint is reinforced by a nonwoven material, shown as structure layer 210 disposed within space 200. According to an exemplary embodiment, a portion of structure layer 210 may be coupled (e.g., adhesively secured, ultrasonically welded, melted, etc.) to the flanges of the adjacent nonwoven cementitious composites 10. According to an alternative embodiment, the joint may not include structure layer 210 or may include another type of reinforcing material.

Figure 16C:
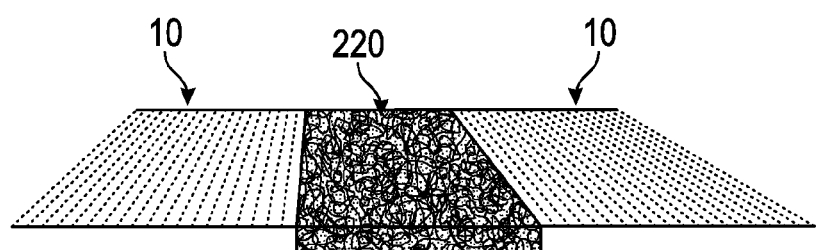

As shown in FIG. 16C, cementitious material, shown as cementitious layer 220 is positioned within structure layer 210. According to an exemplary embodiment, cementitious layer 220 may comprise a cementitious mixture discussed above, a faster-setting cementitious material, a cementitious material having fibers at a higher volume fraction for increased toughness, or includes latex to improve the ductility of the joints. Such a cementitious layer 220 may be compacted (e.g., with a mobile compactor or physically compacted, etc.) within structure layer 210. According to an alternative embodiment, cementitious layer 220 may be positioned within space 200 without a structure layer 210.

Figure 16D:
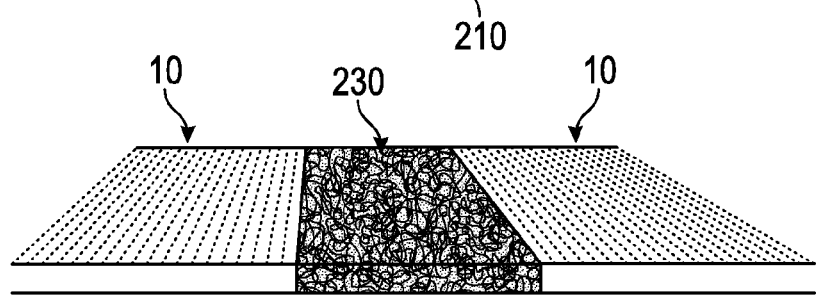
Figure 16E:
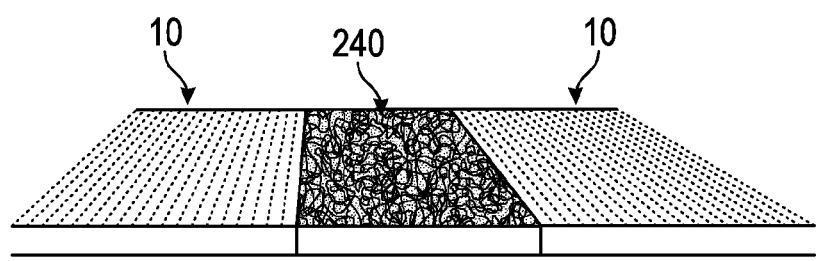

In either embodiment, the manufacturer or operator may thereafter hydrate the cementitious layer to form a hydrated layer 230, as shown in FIG. 16D. Such hydration of cementitious layer 220 may occur after or with hydration of nonwoven cementitious composite 10. According to the exemplary embodiment, shown in FIG. 16E, a coating 240 is applied. Such a coating 240 may be applied after in-situ hydration, may provide a non-slip surface, may serve aesthetic purposes, or may serve another purpose. According to an alternative embodiment, a hydrophilic rubber waterstop is disposed within space 200. Such a sealant may include Adeka ultra seal MC-2010mn.

According to still another embodiment, nonwoven cementitious composite 10 is manufactured using existing geosynthetic clay liner manufacturing lines. In one embodiment, the loom processing traditionally associated with these lines is disengaged. At least one of heat and an adhesive may be used to fuse permeable layer 20 to structure layer 40. The hopper traditionally associated with dispensing bentonite is used to process and dispense the cementitious mixture into the combination of structure layer 40 and impermeable layer 50.

Experimental Testing

Applicants conducted several experiments during the development process of the subject matter disclosed in this Application. A first experiment evaluated various materials and configurations for the permeable layer, the structural layer, the cementitious layer, and the impermeable layer of the nonwoven cementitious composite. The materials tested for each layer during the various experiments are hereinafter discussed. The first experiment confirmed that the combination of the cementitious material and the nonwoven structure layer provide a composite material having an unexpectedly high strength relative to traditional cementitious composites. The experiment also provided various exemplary materials and mixtures for the various layers of the nonwoven cementitious composite.

A first portion of the first experiment tested various materials for the permeable layer using a constant mixture of cementitious material. Such materials included geotextile systems provided by Propex (NW 401, NW 601, and NW 801 nonwoven geotextiles and NM 104-F woven geotextile), Nilex Civil Environmental Group (NW 1601 nonwoven geotextile, GT 4X4 HF, 200 ST, and 315 ST woven geotextile, C-125 erosion control blanket, and P-300 and P-550 erosion control turf), Innegra Technologies (2800d, Absecon 14343, Absecon 14430, and VEL 1200), a polypropylene woven textile, and a knitted textile.

The first portion involved assembling combinations of the products discussed above into various samples of cementitious composites. Cementitious material is traditionally mixed with a fluid (e.g., water) and thereafter deposited into a form, where the material sets into a rigid structure. The experiment first verified that the cementitious material underwent proper hydration, setting, and hardening without pre-mixing the cementitious material with water. Specifically, the first portion involved constructing samples using each of the permeable layer materials positioned over disks measuring three inches in diameter and 0.25 inches in depth. The disks were filled with dry cementitious material having the composition of Portland cement and sieved fine aggregates.

The dry cementitious material was compacted with a hydraulic press for five seconds. Immersion in water for twenty four hours allowed for various hydration observations including, among others, that cracking occurred within some of the cementitious materials from lack of reinforcement and that several samples were properly hydrated even without mixing or agitation. A control sample covered with an impermeable membrane showed no hydration.

A second portion of the experiment tested thirteen cementitious mixtures using a constant permeable layer. The samples were created in a manner discussed above. Such mixtures included the following materials: Portland cement (Type I/II), hydraulic cement having a setting time of approximately five minutes, expansion cement having a setting time of approximately fifteen minutes, patching mortar, fine sand, fly ash, fine bonded sand, gypsum, calcium chloride, superabsorbent polymer, dry accelerator, dry super plasticizer, and Qwix. The combinations tested and relevant observations of the samples are provided below as Table 1.

TABLE 1

| Code | Description | Result |
| --- | --- | --- |
| A-1 | 100% Fast setting mortar mix | Acceptable performance |
| A-2 | 100% Portland cement I/II (sieved through #100) | Acceptable performance |
| A-3 | 50% Portland cement + 50% fly ash (class F, high alumina) | Acceptable upon modification |
| A-4 | 50% Portland cement + 50% fine aggregates | Acceptable upon modification |
| A-5 | 50% Portland cement + 50% bonded (polymeric) sand | Acceptable, but not very advantagous |
| A-6 | 75% Portland cement + 25% super absorbent powder | Mixture absorbed air moisture and got wet |
| A-7 | 75% Portland cement + 25% super absorbent polymer | Mixture expanded as soon as water was added |
| A-8 | 90% Portland cement + 10% calcium chloride (granulars) | Powdered $CaCl_2$ could work |
| A-9 | 75% Portland cement + 25% calcium sulfate (gypsum) | Can cause durability issues |
| A-10 | 100% Hydraulic cement | Lower strength values compared to Portland |
| A-11 | 100% Expansion cement | Lower strength values compared to Portland |
| A-12 | The same as A-1 with maximal packing | Vibration was used for more packing |
| A-13 | The same as A-1 with maximal packing + pressure | Pressure was used for more packing |

A third portion of the first experiment tested twenty two materials for the structure layer of a nonwoven cementitious composite using the same cementitious mixture. Such materials included open-cell sponge foams, cross-linked fibrous foam systems, fibrous materials, and nonwoven fibrous materials, among other types of materials. Specifically, the tested materials included products manufactured by or purchased at Foam Factory (e.g., 1.0 inch thick Dry-fast foam, 1.0 inch thick Super soft foam, 1.0 inch thick polystyrene foam, 0.5 inch thick poly foam, 0.5 inch thick 1.7 pound polyethylene, 0.5 inch thick 2.2 pound polyethylene, and 0.5 inch thick mini-cell foam), Mesa Sells (0.5 inch thick soft foam, 0.5 inch thick layered foam, and 1.0 inch thick fibrous foam), Home Depot (0.5 inch thick air conditioning sponge foam, and 1.0 inch thick air conditioning sponge foam), ACE Hardware (0.25-0.5 inch thick heavy duty scrub fibrous foam, 0.25-0.5 inch thick scrub sponge fibrous foam, and 0.25-0.5 inch thick cleaner pad fibrous foam), Marvel Materials (0.25-0.5 inch thick industrial scrub fibrous foam), and Grainger Industrial Supply (0.25-0.5 inch thick synthetic or steel wool foam pads). The tested materials and relevant observations are provided below in Table 2.

TABLE 2

| Code | Description | Result |
| --- | --- | --- |
| B-1 | Sponge foam #1 (open cell with coarse opening) | This open cell foam works well and allows maximal packing |
| B-2 | Sponge foam #2 (open cell with coarse opening) | Similar to B-1, more expensive |
| B-3 | Sponge foam #3 (open cell with fine opening) | This foam works well but the available foam is too thin |
| B-4 | Sponge foam #4 (semi-open cell with fine opening) | Cells are not fully connected, embedding cement is not possible |
| B-5 | Sponge foam #5 (semi-open cell with fine opening) | Cells are not fully connected, embedding cement is not possible |
| B-6 | Sponge foam #6 (semi-open cell with fine opening) | Cells are not fully connected, embedding cement is not possible |
| B-7 | Sponge foam #7 (open cell with coarse opening) | This foam works well but the available foam is too thick |
| B-8 | Sponge foam #8 (semi-open cell with fine opening) | Cells are not fully connected, embedding cement is not possible |
| B-9 | Sponge foam #9 (semi-open cell with fine opening) | Cells are not fully connected, embedding cement is not possible |
| B-10 | Fibrous foam #1 (polypropylene with coarse opening) | Foam is too flexible and doesn't have a firm structure |
| B-11 | Fibrous foam #2 (silicon carbide with fine opening) | This fibrous foam works well, may need to be modified |
| B-12 | Fibrous foam #3 (silicon carbide with fine opening) | This fibrous foam works well, may need to be modified |
| B-13 | Fibrous foam #4 (synthetic steel with fine opening) | This foam works well, but doesn't have a firm structure |
| B-14 | Fibrous foam #5 (coconut with fine opening) | This fibrous foam works well, may need to be modified |
| B-15 | Fibrous foam #6 (synthetic with coarse opening) | Foam is too flexible and doesn't have a firm structure |
| B-16 | Fibrous foam #7 (steel with coarse opening) | This foam works well, but doesn't have a firm structure |
| B-17 | Fibrous foam #8 (wood with coarse opening) | This foam works well, but doesn't have a firm structure |
| B-18 | Fibrous foam #9 (polypropylene with coarse opening) | This fibrous foam works well, may need to be modified |
| B-19 | Fibrous foam #10 (polypropylene with coarse opening) | This fibrous foam works well, may need to be modified |
| B-20 | Fibrous foam #2 (silicon carbide with fine opening) | This fibrous foam works well, may need to be modified |
| B-21 | Fibrous foam #11 (synthetic steel with coarse opening) | This fibrous foam works well, may need to be modified |
| B-22 | Fibrous foam, #12 (synthetic steel with coarse opening) | Exemplary Selection |

Figure 17:
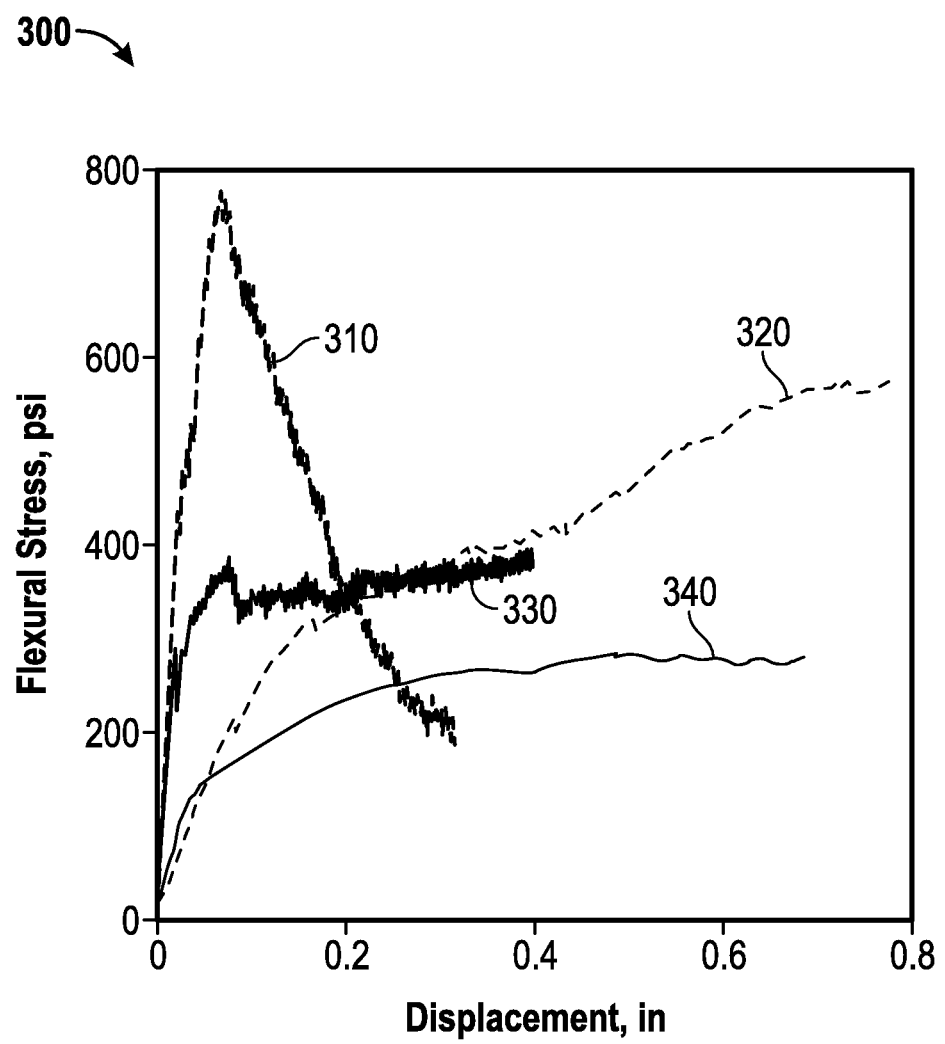
FIG. 17 is a graphical representation of experimental stress versus displacement data for various configurations of nonwoven cementitious composites.

The third portion of the first experiment involved constructing four inch square samples using each of the structure layer materials of Table 2. Each sample included constant permeable layers, impermeable layers, and mixture of cementitious material, which was deposited within the structure layer using each of vibration and pressure. A known amount of water was added to the composite samples, which were thereafter covered by plastic sheets to prevent evaporation and facilitate the curing process. This portion of the experiment concluded by testing the flexural strength of each composite sample using a three-point bending test. An exemplary graph of stress versus displacement 300 is shown in FIG. 17, where data sets 310, 320, 330, and 340 correspond to samples B-16, B-18, B-20, and B-21 from Table 2.

A fourth portion of the first experiment tested the strength and toughness of various samples that included a preferred nonwoven structural layer, a constant permeable and impermeable layer, and various mixtures of cementitious material. Each sample was hydrated to a water-to-cementitious materials ratio of 0.5. The mixtures and corresponding 7-day strength and toughness values are provided below in Table 3. According to an exemplary embodiment, the cementitious layer of a nonwoven cementitious composite includes approximately twenty-five percent Portland cement, twenty-five percent Qwix, forty-eight percent fine aggregates, and two percent non-chloride accelerator.

TABLE 3

| Code | Description | Result | Flexural Strength (PSI) | Flexural Toughness (lb-in) |
| --- | --- | --- | --- | --- |
| C-1 | 100% Portland Cement I/II | May be optimized and used | 785 ± 50 | 285 ± 26 |
| C-2 | 80% Portland Cement + 20% Fly Ash (Class F) | Needs mixing and curing | 572 ± 226 | 201 ± 91 |
| C-3 | 80% Portland Cement + 20% Metakaolin | Needs mixing and curing | 651 ± 154 | 235 ± 76 |

TABLE 3-continued

| Code | Description | Result | Flexural Strength (PSI) | Flexural Toughness (lb-in) |
|---|---|---|---|---|
| C-4 | 80% Portland Cement + 20% Silica Fume | Needs mixing and curing | 596 ± 147 | 205 ± 62 |
| C-5 | 50% Portland Cement + 50% Fine Aggregates (No. 30) | May be optimized and used | 920 ± 69 | 365 ± 41 |
| C-6 | 50% Portland Cement + 50% Qwix (High Alumina Clinker) | May be optimized and used | 722 ± 260 | 271 ± 95 |
| C-7 | 100% Portland Cement + 2% Non-Chloride Accelerator | May be optimized and used | 947 ± 45 | 376 ± 13 |
| C-8 | 100% Portland Cement + 1% Plasticizer (Supercizer) | Needs mixing and curing | N/A | N/A |
| C-9 | 100% Portland Cement + 1% Plasticizer (Hydrocizer) | Needs mixing and curing | N/A | N/A |
| C-10 | 25% Portland Cement + 25% Qwix + 50% Fine Aggregates | May be optimized and used | 942 ± 30 | 382 ± 23 |

The fifth portion of the first experiment tested various materials for the impermeable layer of a nonwoven cementitious composite. Materials tested for this layer include a thin Kevlar-based membrane and products manufactured by CLI Clear-Water Construction (e.g., 0.92 millimeters thick reinforced polyethylene, 1.02 millimeters thick high-density polyethylene, 1.02 millimeters thick linear low-density polyethylene, and XR-5).

The final portion of the first experiment tested three identical nonwoven cementitious composite samples at different ages. As shown below in Table 4, the flexural strength and toughness was tested at one day, seven days, and twenty-eight days post-in-situ hydration.

TABLE 4

| Time from Hydration | Description | Flexural Strength (PSI) | Flexural Toughness (lb-in) |
|---|---|---|---|
| 1 Day | 25% Portland Cement + 25% Qwix + 48% Fine Aggregates + 2% Non-chloride Accelerator | 464 ± 117 | 139 ± 27 |
| 7 Days | Same Mixture | 975 ± 12 | 286 ± 158 |
| 28 Days | Same Mixture | 1044 ± 85 | 400 ± 16 |

A second experiment evaluated various materials and configurations for the permeable layer, the structural layer, and the cementitious layer of the nonwoven cementitious composite. The various portions of the second experiment included several samples prepared in accordance with the procedures of the first experiment. The results of the second experiment are provided below in Tables 5-6. Specifically, the second experiment showed that coated or non-coated microfibers (e.g., strands having a length of less than 0.1 millimeters and a diameter of less than ten microns) may be mixed with the cementitious material to enhance toughness. Fibers manufactured from high density polyethylene having a nominal length of 0.1 millimeters, a five micron diameter, and a coating to improve dispersion were used in mixes 6, 9, and 10 described in Table 5. According to an exemplary embodiment, a nonwoven cementitious composite includes a cementitious layer comprising the combination of materials described by Mix 5b and includes polyethylene fibers as discussed above.

TABLE 5

| Mix | St. Marys Cement | Qwix | Fritz NCA Ca-diformate | CaCl₂ | Normal Sand C778 | Consum. Masonry Sand <600 Microns | Elotex FL2211 Latex (solids) | Ultra Micro Fibers | Meta kaolin | Design Batch Water | 1% Sand Abs. Water | Extra Water |
|---|---|---|---|---|---|---|---|---|---|---|---|---|
| 1 | 550 | 550 | 22 | 0 | 1100 | 0 | 0 | 0 | 0 | 330 | 0 | 0 |
| 2 | 550 | 550 | 0 | 22 | 1100 | 0 | 0 | 0 | 0 | 330 | 0 | 0 |
| 3 | 726 | 374 | 0 | 22 | 1100 | 0 | 0 | 0 | 0 | 330 | 0 | 0 |
| 4 | 726 | 374 | 0 | 22 | 0 | 1100 | 0 | 0 | 0 | 330 | 11 | 20 |
| 5 | 1100 | 0 | 0 | 22 | 0 | 1100 | 0 | 0 | 0 | 330 | 11 | 20 |
| 5b | 920 | 180 | 0 | 22 | 0 | 1100 | 0 | 0 | 0 | 330 | 11 | 0 |
| 6 | 1100 | 0 | 0 | 22 | 0 | 1100 | 0 | 2.1 | 0 | 330 | 11 | 0 |
| 7 | 726 | 220 | 0 | 22 | 0 | 1100 | 0 | 0 | 154 | 330 | 11 | 0 |
| 8 | 946 | 0 | 0 | 22 | 0 | 1100 | 0 | 0 | 154 | 330 | 11 | 0 |
| 9 | 946 | 0 | 0 | 22 | 0 | 1100 | 0 | 2.1 | 154 | 330 | 11 | 0 |
| 9 Repeat | 946 | 0 | 0 | 22 | 0 | 1100 | 0 | 2.1 | 154 | 330 | 11 | 50 |
| 10 | 726 | 274 | 0 | 22 | 0 | 1100 | 0 | 2.1 | 154 | 330 | 11 | 20 |
| 11 | 726 | 274 | 0 | 22 | 0 | 1100 | 0 | 0 | 154 | 330 | 11 | 30 |
| 12 | 946 | 0 | 0 | 22 | 0 | 1100 | 154 | 0 | 0 | 330 | 11 | −98 |
| 13 | 792 | 0 | 0 | 22 | 0 | 1100 | 154 | 0 | 154 | 330 | 11 | −13 |

TABLE 5-continued

| Mix | St. Marys Cement | Qwix | Fritz NCA Ca-diformate | CaCl$_2$ | Normal Sand C778 | Consum. Masonry Sand <600 Microns | Elotex FL2211 Latex (solids) | Ultra Micro Fibers | Meta kaolin | Design Batch Water | 1% Sand Abs. Water | Extra Water |
|---|---|---|---|---|---|---|---|---|---|---|---|---|
| 14 | 660 | 132 | 0 | 22 | 0 | 1100 | 154 | 0 | 154 | 330 | 11 | −8 |
| 15 | 660 | 132 | 0 | 22 | 0 | 1100 | 154 | 2.1 | 154 | 330 | 11 | 0 |
| 16 | 946 | 0 | 0 | 22 | 0 | 1100 | 154 | 2.1 | 0 | 330 | 11 | −63 |
| 17 | 792 | 0 | 0 | 22 | 0 | 1100 | 154 | 2.1 | 154 | 330 | 11 | −16 |

TABLE 6

| Mix | Actual w/cm | Initial Set | Final Set | Vicat C191 Test 1 day C109 (PSI) | Vicat C191 Test 7 Day C109 (PSI) | $/ft2 |
|---|---|---|---|---|---|---|
| 1 | 0.30 | 0:15 | 0:18 | 9130 | 10640 | 0.24 |
| 2 | 0.30 | 0:08 | 0:11 | 7450 | 11815 | 0.23 |
| 3 | 0.30 | 0:13 | 0:17 | 6315 | 8690 | 0.20 |
| 4 | 0.32 | 0:13 | 0:16 | 5030 | 7600 | 0.20 |
| 5 | 0.32 | 1:30 | 1:40 | 5555 | 10080 | 0.15 |
| 5b | 0.30 | 0:18 | 0:24 | 7565 | 10825 | 0.17 |
| 6 | 0.30 | 1:09 | 1:20 | 6130 | 10115 | 0.16 |
| 7 | 0.30 | 0:09 | 0:11 | 3740 | 9790 | 0.25 |
| 8 | 0.30 | 0:22 | 0:38 | 5105 | 11265 | 0.22 |
| 9 | 0.30 | 0:29 | 0:40 | 5115 | 10400 | 0.24 |
| 9 Repeat | 0.35 | 1:11 | 1:29 | 5140 | 10780 | 0.24 |
| 10 | 0.30 | 0:05 | 0:09 | 3000 | 7650 | 0.28 |
| 11 | 0.31 | 0:12 | 0:14 | 4140 | 8715 | 0.27 |
| 12 | 0.25 | 0:24 | 0:48 | 1445 | 2575 | 0.31 |
| 13 | 0.34 | 1:20 | 2:08 | 2045 | 5055 | 0.38 |
| 14 | 0.34 | 0:26 | 0:54 | 1835 | 4705 | 0.40 |
| 15 | 0.35 | 0:27 | 0:56 | 1940 | 5030 | 0.42 |
| 16 | 0.28 | 1:10 | 2:13 | 2230 | 4665 | 0.32 |
| 17 | 0.33 | 0:48 | 1:53 | 1785 | 5055 | 0.40 |

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the orientation of various elements may differ according to other exemplary embodiments and that such variations are intended to be encompassed by the present disclosure.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" may be used to mean serving as an example, instance or illustration. Any embodiment or design described herein as "exemplary" may be not necessarily to be construed as preferred or advantageous over other embodiments or designs. Rather, use of the word exemplary may be intended to present concepts in a concrete manner. Accordingly, all such modifications are intended to be included within the scope of the present inventions. The order or sequence of any process or method steps may be varied or re-sequenced according to alternative embodiments. Any means-plus-function clause may be intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A cementitious composite material for in-situ hydration, the composite comprising:
    a nonwoven first layer, the nonwoven first layer having a first side and an opposing second side, wherein the nonwoven first layer forms a plurality of discrete nodes spaced relative to one another along a first direction and a second direction;
    a cementitious material disposed within the nonwoven first layer, wherein the cementitious material includes a plurality of cementitious particles;
    a second layer disposed along the first side of the nonwoven first layer; and
    a third layer disposed along the opposing second side of the nonwoven first layer and configured to prevent at least a portion of the plurality of cementitious particles from migrating out of the nonwoven first layer, wherein the nonwoven first layer and the second layer comprise flexible materials and the second layer is coupled to the nonwoven first layer at the plurality of discrete nodes.

2. The composite of claim 1, wherein the volume within the nonwoven first layer defines an open space.

3. The composite of claim 2, wherein the open space defines between 80.0 percent and 99.8 percent by volume of the nonwoven first layer.

4. The composite of claim 3, wherein the open space defines between 95.0 percent and 99.8 percent by volume of the nonwoven first layer.

5. The composite of claim 1, wherein the nonwoven first layer defines a pattern of projections and a pattern of depressions.

6. The composite of claim 5, wherein at least some of the pattern of projections define a plurality of interstices that contain at least a portion of the cementitious material, and wherein at least some of the pattern of depressions define the plurality of discrete nodes.

7. A cementitious composite material for in-situ hydration, the composite comprising:
 a nonwoven mesh layer defining a plurality of spaces configured to receive particles, the plurality of spaces each having a size of between 0.5 microns and three millimeters, wherein the nonwoven mesh layer forms a plurality of discrete nodes spaced relative to one another along a first direction and a second direction;
 a cementitious material in a pre-hydration condition disposed within the nonwoven mesh layer and having particles sized to pass through and into the plurality of spaces;
 a sealing layer disposed along a first side of the nonwoven mesh layer; and
 a containment layer disposed along an opposing second side of the nonwoven mesh layer and configured to prevent at least some of the cementitious material from migrating out of the nonwoven mesh layer, wherein the nonwoven mesh layer and the sealing layer comprise flexible materials and the sealing layer is coupled to the nonwoven mesh layer at the plurality of discrete nodes.

8. The composite of claim 7, wherein the nonwoven mesh layer has a thickness of between five millimeters and one hundred millimeters.

9. The composite of claim 7, wherein the sealing layer is integrally formed with the nonwoven mesh layer.

10. The composite of claim 7, wherein the sealing layer is coupled to the nonwoven mesh layer.

11. The composite of claim 7, wherein an exposed portion of the nonwoven mesh layer protrudes from the cementitious material, and wherein the containment layer is coupled to the exposed portion of the nonwoven mesh layer.

12. The composite of claim 11, wherein the containment layer is at least one of adhesively secured, heat welded, and melted to the exposed portion of the nonwoven mesh layer.

13. The composite of claim 7, wherein the containment layer is water permeable and comprises a sheet having apertures sized to facilitate a flow of an applied hydration water therethrough while preventing more than 10% by weight of the cementitious material from migrating therethrough prior to in-situ hydration.

14. The composite of claim 13, wherein the sealing layer comprises a sheet of a flexible material having a surface configured to retain the cementitious material and the applied hydration water.

15. The composite of claim 14, wherein the containment layer comprises at least one of a biodegradable material and a water soluble material.

16. The composite of claim 14, wherein the containment layer is releasably coupled to the nonwoven mesh layer thereby facilitating post-installation removal of the containment layer.

* * * * *